US012710218B2

(12) United States Patent
Hong et al.

(10) Patent No.: US 12,710,218 B2
(45) Date of Patent: Aug. 18, 2026

(54) REFRIGERATOR AND HOME APPLIANCE HAVING A DOOR WITH VARIABLE LIGHT EMISSION

(71) Applicant: LG Electronics Inc., Seoul (KR)

(72) Inventors: Yoonjung Hong, Seoul (KR); Heekyung Kang, Seoul (KR); Yongbeom Ma, Seoul (KR); Kunwoo Lee, Seoul (KR); Jumin Chi, Seoul (KR)

(73) Assignee: LG Electronics Inc., Seoul (KR)

( * ) Notice: Subject to any disclaimer, the term of this patent is extended or adjusted under 35 U.S.C. 154(b) by 199 days.

(21) Appl. No.: 18/688,879

(22) PCT Filed: Sep. 1, 2022

(86) PCT No.: PCT/KR2022/013117
§ 371 (c)(1),
(2) Date: Mar. 4, 2024

(87) PCT Pub. No.: WO2023/033566
PCT Pub. Date: Mar. 9, 2023

(65) Prior Publication Data
US 2024/0377121 A1 Nov. 14, 2024

(30) Foreign Application Priority Data

Sep. 3, 2021 (KR) ........................ 10-2021-0117351
Sep. 17, 2021 (KR) ........................ 10-2021-0125153

(51) Int. Cl.
*F25D 27/00* (2006.01)
*F25D 23/02* (2006.01)
(Continued)

(52) U.S. Cl.
CPC ........... *F25D 23/02* (2013.01); *F25D 27/005* (2013.01); *F21V 33/0044* (2013.01);
(Continued)

(58) Field of Classification Search
CPC ...... F25D 23/02; F25D 23/028; F25D 29/005; F25D 29/006; F25D 2400/36;
(Continued)

(56) References Cited

U.S. PATENT DOCUMENTS 8,789,900 B2 7/2014 Laible et al.
2011/0079034 A1* 4/2011 Kim ........................ F25D 23/02
62/449
(Continued)

FOREIGN PATENT DOCUMENTS

CN 103250018 8/2013
CN 112629141 4/2021
(Continued)

*Primary Examiner* — Jerry-Daryl Fletcher
*Assistant Examiner* — Daniel C Comings
(74) *Attorney, Agent, or Firm* — Fish & Richardson P.C.

(57) ABSTRACT

A home appliance, according to one aspect, comprises: a cabinet that has a space; a door that opens and closes the space and includes a lighting device having a light source and a front plate through which light irradiated from the light source passes; a detection unit that detects opening of the door, and a control unit that controls the lighting device on the basis of information detected by the detection unit, wherein the control unit controls the light source such that the light source changes from a first state to a second state upon the opening of the door.

39 Claims, 24 Drawing Sheets

(51) Int. Cl.
*F21V 33/00* (2006.01)
*F21W 131/305* (2006.01)

(52) U.S. Cl.
CPC . *F21W 2131/305* (2013.01); *F25D 2327/001* (2013.01); *F25D 2700/02* (2013.01)

(58) Field of Classification Search
CPC ............. F25D 27/005; F25D 2737/001; F25D 2700/02; F21V 33/0044; F21W 2131/305
See application file for complete search history.

(56) References Cited

U.S. PATENT DOCUMENTS

| | | | | |
|---|---|---|---|---|
| 2017/0089632 | A1* | 3/2017 | Kang | G06F 1/1677 |
| 2017/0191745 | A1* | 7/2017 | Choi | H05B 47/16 |

FOREIGN PATENT DOCUMENTS

| | | |
|---|---|---|
| JP | 5853163 | 2/2016 |
| KR | 10-2008-0076594 | 8/2008 |
| KR | 10-2011-0037303 | 4/2011 |
| KR | 10-2018-0089652 | 8/2018 |

* cited by examiner (a)

(b)

(a)

(b)

REFRIGERATOR AND HOME APPLIANCE HAVING A DOOR WITH VARIABLE LIGHT EMISSION

CROSS-REFERENCE TO RELATED APPLICATIONS

This application is a National Stage application under 35 U.S.C. § 371 of International Application No. PCT/KR2022/013117, filed on Sep. 1, 2022, which claims the benefit of Korean Patent Application No. 10-2021-0117351, filed on Sep. 3, 2021, and Korean Patent Application No. 10-2021-0125153, filed on Sep. 17, 2021. The disclosures of the prior applications are incorporated by reference in their entirety.

TECHNICAL FIELD

The present disclosure relates to a refrigerator and a home appliance.

BACKGROUND ART

In general, a refrigerator is a home appliance for storing foods in an internal storage space, which is shield by a refrigerator door, at a low temperature by low temperature air. The refrigerator cools the inside of the storage space using cool air generated by heat-exchanging with a refrigerant that circulates a cooling cycle to store the foods in an optimum state.

Such refrigerators tend to increase more and more in size and provide multi-functions due to the trends of change of dietary life and high quality, and accordingly, refrigerators provided with various structures and convenience devices in consideration of user convenience are brought to the market.

In order to harmonize with an environment in which the refrigerator is disposed or with surrounding furniture or home appliances, technologies structures for varying an outer appearance of a door front of the refrigerator are developed, and this trend is the same throughout the home appliance.

U.S. Pat. No. 8,789,900 (Cited Reference 1) discloses a structure in which a decoration panel forming an outer appearance is installed on a door front of a refrigerator, and here, the outer appearance of the door front is formed according to a user's preference by detachably configuring the decoration panel.

However, the refrigerator of the Cited Reference 1 having this structure has a problem in that, when a user wants to change the outer appearance, the entire decoration panel needs to be removed and replaced, and it is not possible to use the decoration panel before replacement any longer.

To solve this limitation, Chinese Patent Application No. 103250018 (Cited Reference 2) discloses a refrigerator in which a reflective layer and a transparent panel are disposed on a door front and colored light emitting members are mounted on both side ends of the reflective layer to cause the transparent panel to glow with set color.

However, in the case of Cited Reference 2, it does not disclose a technology that causes a set color to glow on a transparent panel based on opening and closing the door of the refrigerator.

DISCLOSURE

Technical Problem

An embodiment of the present disclosure provides a refrigerator and a home appliance that can emit a set color on the door to notify that the door has been opened when opened.

Alternatively or additionally, an embodiment of the present disclosure provides a refrigerator and a home appliance that can inform the user of the angle at which the door can be opened by varying the glowing area on the door.

Alternatively or additionally, an embodiment of the present disclosure provides a refrigerator and a home appliance that can notify the user of the non-closed state of the door by causing a set color to glow on the door.

Alternatively or additionally, embodiments of the present disclosure provides a refrigerator and a home appliance that may allow a color set on the door to glow to inform the user that the opening speed and/or closing speed of the door is faster when the opening speed and/or closing speed of the door is greater than the reference speed.

Alternatively or additionally, an embodiment of the present disclosure provides a refrigerator and a home appliance that can indirectly check the closing speed of the door by controlling the turning-on interval of a plurality of LEDs in the door.

Alternatively or additionally, an embodiment of the present disclosure provides a refrigerator and a home appliance in which warning information can be displayed on the door to inform the user that the door is closing quickly.

Technical Solution

A home appliance according to one aspect may include a cabinet having a space therein; a door configured to open and close the space and including a lighting device including a light source, and a front plate through which light emitted from the light source transmits; a sensing part configured to detect opening of the door; and a controller configured to control the lighting device based on information detected by the sensing part.

The controller may be configured to control the light source so that the light source changes from a first state to a second state according to the opening of the door.

The sensing part may include an acceleration sensor or a gyro sensor configured to detect at least one of an opening angle and an opening and closing speed of the door.

The controller may be configured to change the state of the light source based on at least one of an opening angle and an opening and closing speed of the door.

The controller may be configured to control the light source so that the glowing area on the front plate increases as the opening angle of the door increases.

The light source may include a plurality of LEDs. The controller may be configured to control the light source so that the number of LEDs that are turned on increases as the opening angle of the door increases.

The controller may be configured to control the light source so that all of the plurality of LEDs are turned on when the door is opened by a preset maximum opening angle.

The controller, according to the opening and closing speed of the door, may be configured to control the light source so that the rate of increase or decrease of the glowing area on the front plate is variable.

The controller may be configured to change a turning-on interval of the LEDs that are sequentially turned on or off according to the opening and closing speed of the door.

The controller may be configured to control the light source to change the operating state of the light source to notify a non-closed state of the door when the door is opened and a reference time has elapsed.

The controller may be configured to control the light source so that light of a first color is emitted from the light source when the door is opened and before the reference time elapses.

The controller may be configured to control the light source to emit light of a second color from the light source when the door is opened and the reference time has elapsed.

The controller may be configured to control the light source so that the light source changes from a current state to a third state when the closing of the door is detected by the sensing part.

The door may include a plurality of doors arranged in a left and right direction or a vertical direction.

The sensing part may be provided in each of the plurality of doors.

The controller may be configured to control the light source of the second door so that the light source of the second door of the plurality of doors changes from the first state to the second state according to the opening of the first door of the plurality of doors.

The controller may be configured to change the state of the light source of the second door based on at least one of an opening angle and an opening and closing speed of the first door.

The controller may be configured to control the light source of the second door so that as the opening angle of the first door increases, the glowing area on the front plate of the second door increases.

The controller may be configured to control the light source of the second door so that as the opening angle of the first door increases, the number of LEDs that are turned on increases.

The controller may be configured to control the light source so that the speed of increase or decrease of the glowing area on the front plate of the second door is variable, according to the opening and closing speed of the first door.

The controller may be configured to vary a turning-on interval of the LEDs that are sequentially turned on in the second door according to the opening and closing speed of the first door.

While the first door is opened, the glowing area may increase in the direction away from the portion of the second door adjacent to the first door.

While the first door is closed, the glowing area may be reduced from a portion of the second door that is far from the first door to a direction closer to the first door.

When the closing of the first door is detected by the sensing part, the controller may be configured to control the light source of the second door so that the light source of the second door changes from a current state to the third state.

When the first door is opened and before the reference time elapses, the controller may be configured to control the light source of the second door to change the operating state of the light source of the second door to notify a non-closed state of the door.

When the first door is opened and before the reference time elapses, the controller may be configured to control the light source of the second door so that light of a first color is emitted from the light source of the second door.

When the first door is opened and the reference time has elapsed, the controller may be configured to control the light source of the second door so that light of a second color is emitted from the light source of the second door.

The controller may be configured to control the light source of the first door so that the light source of the first door changes from the first state to the second state according to the opening of the first door of the plurality of doors.

The controller may be configured to control the light source of the second door of the plurality of doors so that the light source of the second door is changed from the first state to the second state when the opening angle of the first door is equal to or greater than a reference angle.

The controller may be configured to control the light source of the first door so that as the opening angle of the first door increases, the glowing area on the front plate of the first door increases.

The controller may be configured to control the light source so that the speed of increase or decrease of the glowing area on the front plate of the first door is variable, according to the opening and closing speed of the first door.

When the opening angle of the first door increases, the glowing area may increase in a direction away from a portion of the first door that is close to the second door adjacent to the first door.

When the first door is closed, the glowing area may decrease in a direction close from a portion of the first door that is away from the second door adjacent to the first door.

After the opening of the door is detected, when a rotational speed of the door is greater than a reference speed, the controller may be configured to control the light source of the door so that the light source changes from the first state to the second state.

When the door is detected to be closed after being opened, the controller may be configured to determine whether a warning notification condition is satisfied, and, when the warning notification condition is satisfied, to control the light source of the door to be changed from a current state to the third state.

When the warning notification condition is satisfied may be at least one of: when a closing speed of the door is greater than a reference speed; when the opening of the door is detected again within a set time after the closing of the door is detected; when vibration of a set magnitude or greater is detected by a vibration sensor provided on the door, after the closing of the door is detected; and when a knock input is detected by a knock detection sensor provided in the door to detect a knock after the closing of the door is detected.

The controller may be configured to determine whether a warning notification condition is satisfied, after the first door of the plurality of doors is opened.

The controller may be configured to control the state of the light source of at least one door of the first door and a second door that is a closed door of the plurality of doors to be changed, when the warning notification condition is satisfied.

The controller may be configured to control the state of at least one light sources of the first door and the second door to be changed, when the controller determines that the warning notification condition is satisfied before detecting the closing of the first door.

When the warning notification condition is satisfied may be when the opening speed of the door is greater than a reference speed.

The controller may be configured to control the state of at least one light sources of the first door and the second door to be changed, when the controller determines that the warning notification condition is satisfied after detecting the closing of the first door.

When the warning notification condition is satisfied may be at least one of: when a closing speed of the first door is greater than a reference speed; when the opening of the first door is detected again within a set time after the closing of the first door is detected; when vibration of a set magnitude or greater is detected by a vibration sensor provided on at least one of the plurality of doors, after the closing of the first door is detected; and when a knock input is detected by a knock detection sensor provided on at least one of the plurality of doors to detect a knock after the closing of the first door is detected.

Some of the plurality of doors may include a display. The controller may be configured to control the display so that warning information is output on the display, when the controller determines that the warning notification condition is satisfied after detecting the closing of the first door.

The number of times the warning notification condition is satisfied may be accumulated and stored in memory. Information about the accumulated number of times stored in the memory may be displayed on the display.

The home appliance may further include an output part configured to output sound information.

The controller may be configured to control the output part to output warning information from the output part when the controller determines that the warning notification condition is satisfied after detecting the closing of the first door.

The controller may be configured to cause a first color to be emitted from a light source of at least one of the first door and the second door when the closing of the first door is detected.

The controller may be configured to change the state of a light source of at least one of the first door and the second door when the controller determines that the warning notification condition is satisfied.

The controller may be configured to turn off a light source of at least one of the first door and the second door after a predetermined time has passed, when the controller determines that the warning notification condition is not satisfied after detecting the closing of the first door.

Advantageous Effect

The following effects can be expected from a refrigerator and a home appliance according to the proposed embodiment.

According to one embodiment, when the door is opened, the color set on the door may glow, allowing the user to easily check the open state of the door.

According to one embodiment, as the glowing area on the door changes, the user can check the angle at which the door can be opened.

According to one embodiment, when the opening time of the door elapses the reference time, the user can check the non-closed state of the door by making the door glow in a set color.

According to one embodiment, when the opening speed and/or closing speed of the door is greater than the reference speed, the color set on the door glows, allowing the user to easily recognize that the opening speed and/or closing speed of the door was fast.

According to one embodiment, there is an advantage in that the opening speed and/or closing speed of the door can be indirectly checked by controlling the turning-on interval of a plurality of LEDs or some LEDs in the door.

According to one embodiment, when the closing speed of the door is greater than the reference speed for the user, warning information may be displayed on the door display, so the user can easily recognize that the closing speed of the door is greater than the standard speed.

BEST MODE

Hereinafter, detailed embodiments will be described in detail with reference to the accompanying drawings. However, the present disclosure is limited to the embodiments in which the spirit of the present disclosure is proposed, and other degenerate idea or other embodiments included in the scope of the present disclosure may be easily proposed by addition, changes, deletions, etc. of other elements.

Hereinafter, a refrigerator will be described as an example of a home appliance, but the description of the refrigerator according to the present disclosure may be applied to various home appliances including a cabinet having a space therein and a door configured to open and close the space. The home appliance may include, for example, an air conditioner, a clothes manager, a washing machine, a dryer, a dish washing machine, a cooking appliance, and the like.

Prior to a description, directions are defined. In an embodiment of the present disclosure, a direction toward a door is defined as a front direction with respect to a cabinet shown in FIG. 1, a direction toward the cabinet with respect to the door is defined as a rear direction, a direction toward a bottom on which a refrigerator is installed is defined as a downward direction, and a direction away from the bottom is defined as an upward direction.

Figure 1:
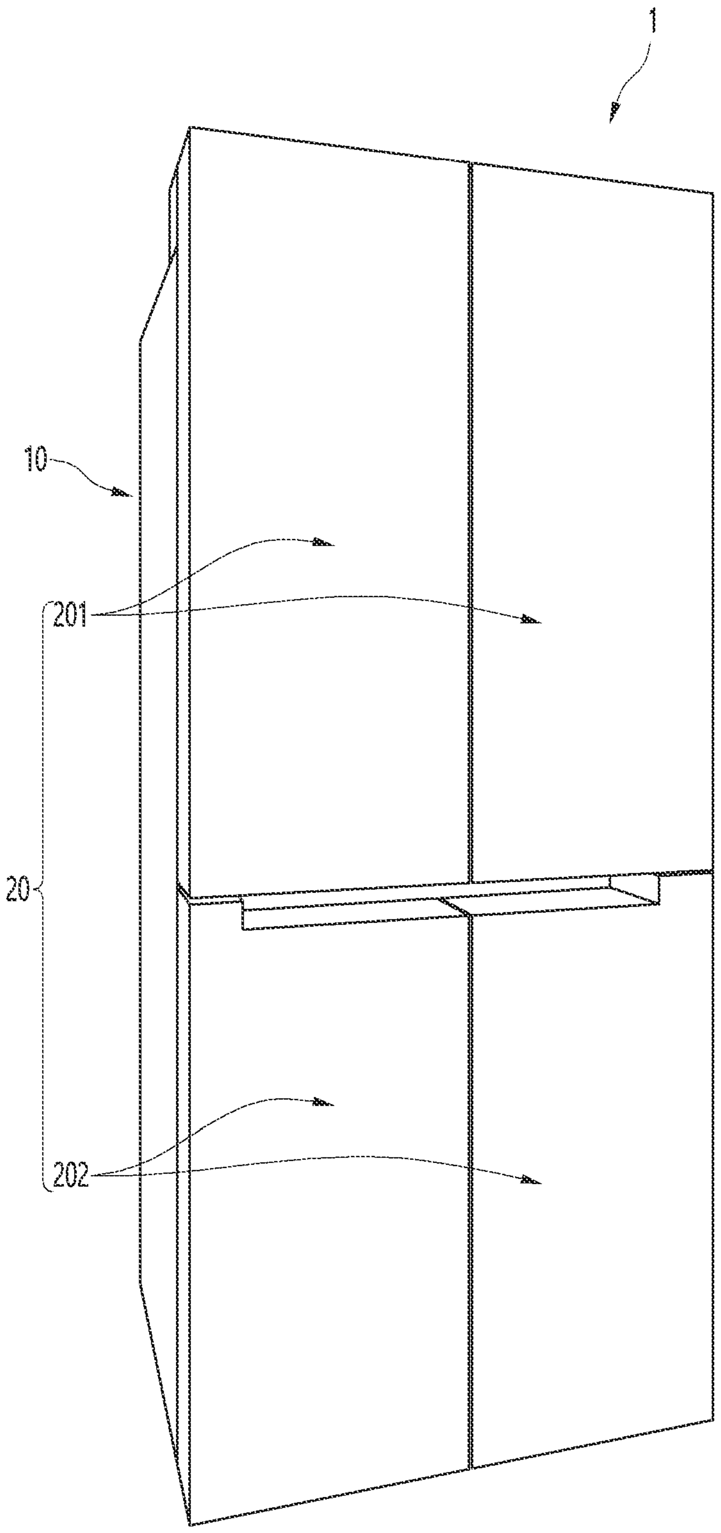
FIG. 1 is a front view of a refrigerator according to an embodiment of the present disclosure.

FIG. 1 is a perspective view of a refrigerator according to an embodiment.

Referring to FIGS. 1, a refrigerator 1 according to an embodiment of the present disclosure may include a cabinet 10 defining a storage space (or storage section) and a door 20 for opening and closing the storage space of the cabinet 10.

For example, the cabinet 10 may form the storage space partitioned in a vertical direction, a refrigerating compartment may be formed at an upper portion, and a freezing compartment may be formed at a lower portion. The refrigerating compartment may be referred to as an upper storage space, and the freezing compartment may be referred to as a lower storage space.

The door 20 may open and close each of the refrigerating compartment and the freezing compartment. For example, the door 20 may be rotatably mounted on the cabinet 10, and the refrigerating compartment and the freezing compartment may each be opened and closed by rotation. Alternatively, the door 20 may be configured to open and close the refrigerating compartment and/or the freezing compartment by being drawn in and out.

The door 20 may include a refrigerating compartment door 201 for opening and closing the refrigerating compartment and a freezing compartment door 202 for opening and closing the freezing compartment. The refrigerating compartment door 201 may be referred to as an upper door, and the freezing compartment door 202 may be referred to as a lower door.

The refrigerating compartment door 201 may include a pair of a left refrigerating compartment door and a right refrigerating compartment door that are arranged side by side. The left refrigerating compartment door and the right refrigerating compartment door may open and close the refrigerating compartment while being independently rotated. The left refrigerating compartment door and the right refrigerating compartment door may be disposed adjacent to each other and may have the same size.

The freezing compartment door 202 may include a pair of a left freezing compartment door and a right freezing compartment door that are arranged side by side. The left freezing compartment door and the right freezing compartment door may open and close the freezing compartment while being independently rotated. The left freezing compartment door and the right freezing compartment door may be disposed adjacent to each other and may have the same size.

Needless to say, although a refrigerator having a structure in which the refrigerating compartment is defined above the freezing compartment is described as an example in this embodiment, the present disclosure may be applied to all types of refrigerators equipped with a door without being limited to a type of a refrigerator.

An outer appearance of the front surface of the refrigerator 1 may be formed in the state where the door 20 is closed and may form the out appearance of the refrigerator 1 viewed from the front in the state where the refrigerator 1 is installed.

The door 20 may have a structure in which a front surface selectively emits light and may be configured to glow with set color or brightness. Thus, a user may change front color or brightness of the door 20 without separating or disassembling the door 20 and may change the overall outer appearance of the refrigerator 1.

Hereinafter, the structure of the door 20 will be described in detail with reference to drawings.

Figure 2:
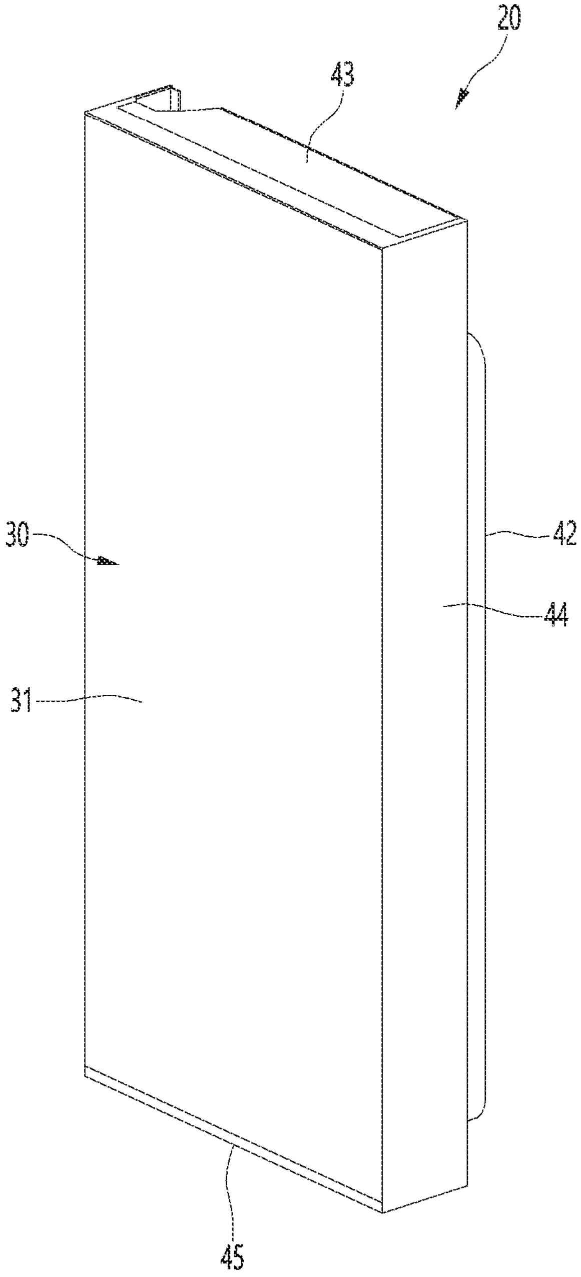
FIG. 2 is a perspective view of a refrigerator door according to an embodiment present disclosure.
Figure 3:
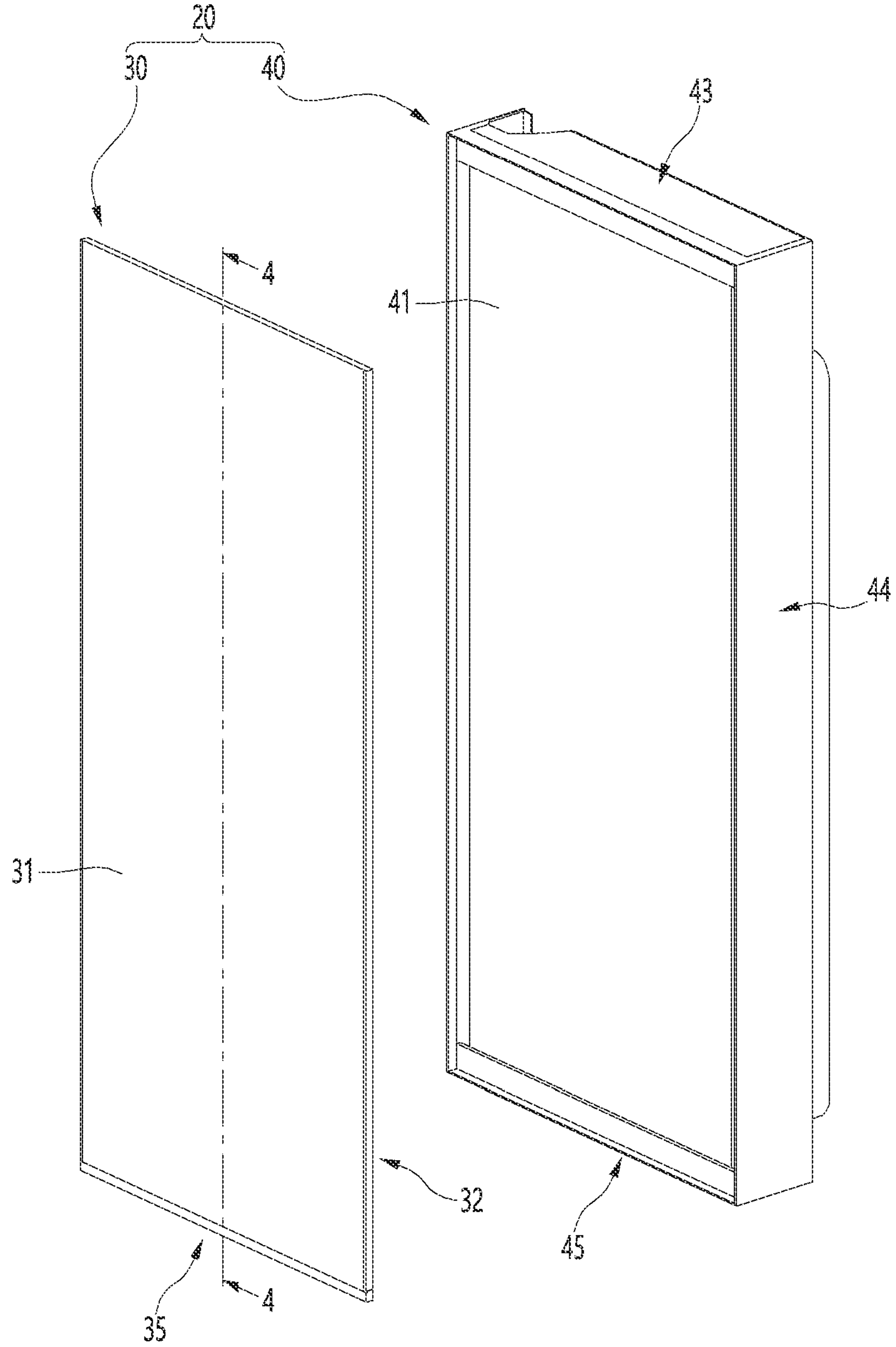
FIG. 3 is a view illustrating a state where a panel assembly is separated from the refrigerator door.

FIG. 2 is a perspective view of a refrigerator door according to an embodiment present disclosure. FIG. 3 is a view illustrating a state where a panel assembly is separated from the refrigerator door.

As illustrated in FIGS. 2 and 3, the door 20 may include a door body 40 forming the overall shape of the door 20, and a panel assembly 30 forming a front appearance of the door 20. That is, the panel assembly 30 is mounted on a front surface of the door body 40.

The door body 40 may include a body plate 41 defining a front surface and a door liner 42 defining a rear surface.

The body plate 41 may be formed of a metal material and may be formed in a plate shape having a size corresponding to the panel assembly 30. The door liner 42 may be formed of a plastic material and may form a bottom shape of the door 20.

The door body 40 may further include a side decoration 44 forming right and left side surfaces of the door body 40. The side decoration 44 may connect right and left side ends of the body plate 41 and right and left side ends of the door liner 42.

The door body 40 may include an upper cap decoration 43 and a lower cap decoration 45 that form top and bottom surfaces of the door body 40. The upper cap decoration 43 may be connected to an upper end of the side decoration 44, an upper end of the body plate 41, and an upper end of the door liner 42. The lower cap decoration 45 may be connected to a lower end of the side decoration 44, a lower end of the body plate 41, and a lower end of the door liner 42.

An outer appearance of the door body 40 may be formed by the body plate 41, the door liner 42, the side decoration 44, the upper cap decoration 43, and the lower cap decoration 45.

An insulator may be filled in an internal space of the door body 40, which is formed by coupling the body plate 41, the door liner 42, the side decoration 44, the upper cap decoration 43, and the lower cap decoration 45, and may provide an insulation structure to prevent heat from being transferred through the door 20. The insulator may be formed, for example, as a time elapses after a foaming liquid is filled. The door body 40 may be provided with an injection hole for filling the foaming liquid.

An opened forward panel receiving space 410 may be formed on a front surface of the door body 40. That is, front ends of the side decoration 44, the upper cap decoration 43, and the lower cap decoration 45 may protrude more forward than the front surface of the body plate 41.

A panel receiving space 410 that is opened forward may be defined at a front side of the door body 41. The panel receiving space 410 may be formed with a size corresponding to the size of the panel assembly 30 and the panel assembly 30 may be inserted into the panel receiving space 410. A circumference of the panel assembly 30 may be supported by a circumferential surface of the panel receiving space 410, that is, protruding portions of the side decoration 44, the upper cap decoration 43, and the lower cap decoration 45.

The panel assembly 30 may be formed in a plate shape as a whole and may be formed with a size corresponding to a front surface of the door body 40. Thus, when the panel assembly 30 is mounted on the front surface of the door body 40, the panel assembly 30 may shield the front surface of the door body 40 and may form an outer appearance of the front surface of the door 20. Since the panel assembly 30 may form the outer appearance of the front surface of the door 20, the panel assembly 30 may be referred to as a door panel, and since the panel assembly 30 may form the outer appearance of the front surface of the refrigerator 1, the panel assembly 30 may also be referred to as an exterior panel.

In the state where the panel assembly 30 is mounted on the door body 40, a rear surface of the panel assembly 30 may be fixed in contact with the body plate 41. To fixedly mount the panel assembly 30, a lower end of the panel assembly 30 may be caught and restrained with a lower end of the lower cap decoration 45, and an upper end of the panel assembly 30 may be coupled to an upper end of a front surface of the upper cap decoration 43 to firmly couple the panel assembly 30 to the door body 40. The panel assembly 30 may be detachably mounted from the door body 40 for services and maintenance.

A front surface of the panel assembly 30 may be exposed forward in the state where the panel assembly 30 is mounted on the door body 40, and the panel assembly 30 may substantially form the outer appearance of the front surface of the door 20. The panel assembly 30 may be configured to emit light from an entire front thereof and may be configured to glow with various colors.

To this end, a lighting device 36 may be provided inside the panel assembly 30. A wire (not shown) may be connected to the lighting device 36 in order to supply and control power. The wire (not shown) may be exposed outside the rear surface of the panel assembly 30, and a connector (not shown) may be provided on an end of the wire (not shown).

A structure connected to the connector of the wire to supply power to the lighting device 36 may be provided on a front surface of the door body 40.

Hereinafter, the structure of the panel assembly 30 will be described in more detail with reference to drawings.

Figure 4:
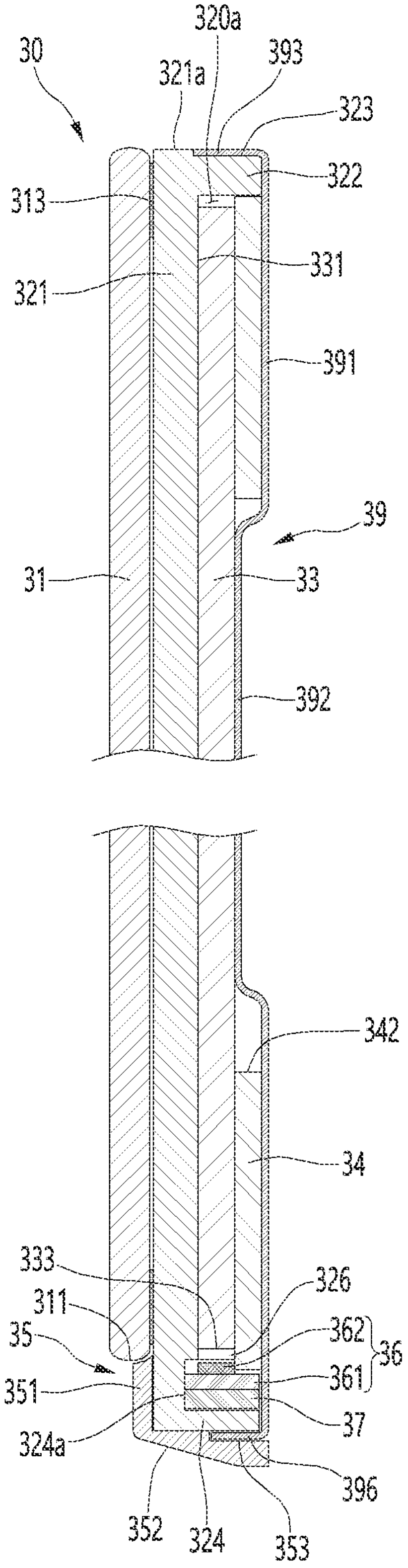
FIG. 4 is a cross-sectional view taken along line 4-4 of FIG. 3.
Figure 5:
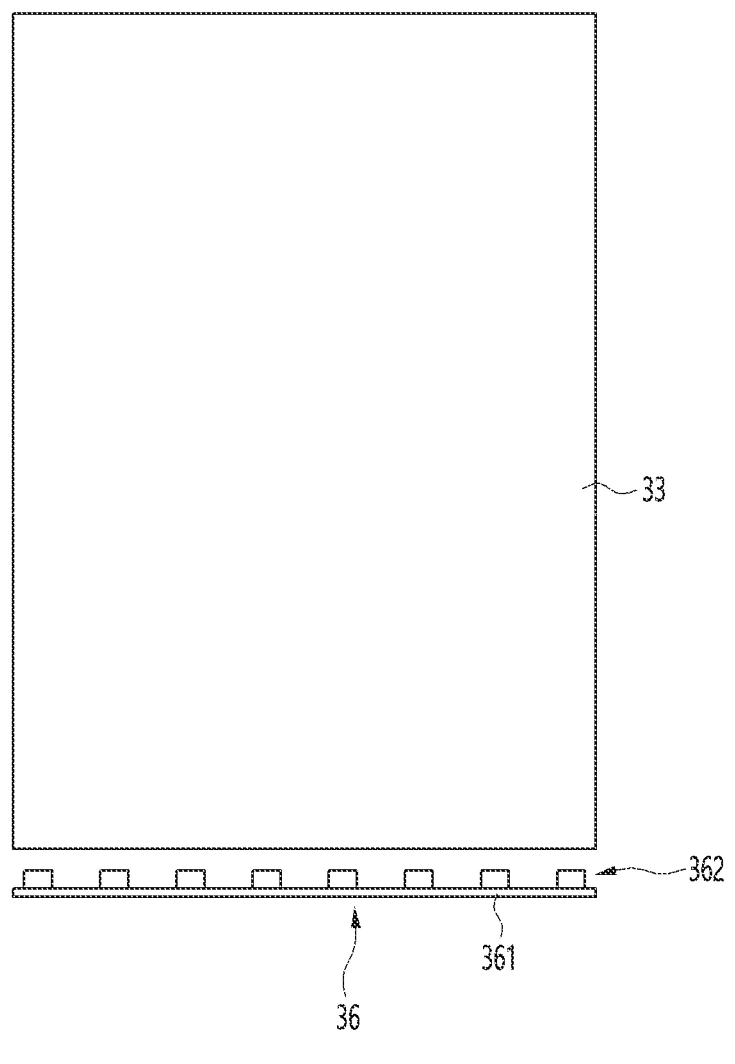
FIG. 5 is a view illustrating the disposition of a light guide plate and a light source.

FIG. 4 is a cross-sectional view taken along line 4-4 of FIG. 3, and FIG. 5 is a view illustrating the disposition of a light guide plate and a light source.

Referring to FIGS. 4 and 5, the panel assembly 30 may include a front plate 31 forming an outer appearance of the front surface.

The panel assembly 30 may further include a lighting device 36 for emitting light to cause the front plate 31 to glow.

The panel assembly 30 may further include a light guide plate 33 for guiding the light emitted from the lighting device 36.

The panel assembly 30 may further include a diffusion member 32 allowing the light guide plate 33 to be spaced apart from the front plate 31 and diffusing the light. The diffusion member 32 may also be referred to as a support member in terms of supporting the light guide plate 33.

The lighting device 36 and the light guide plate 33 may be mounted or supported on the diffusion member 32.

The panel assembly 30 may further include a back cover 39 defining a rear surface of the panel assembly 30.

The front plate 31 may be formed in a rectangular plate shape and may be formed of a material that transmits light therethrough. For example, the front plate 31 may be formed of a glass material such as blue glass, white glass, and vapor deposition glass or may be formed of other materials for transmitting light therethrough, such as ABS, PMMA, or PC. The front plate 31 may be referred to as a transparent plate or an out plate.

The front plate 31 may be formed to be transparent to allow light reflected by the light guide plate 33 to be transmitted. In this case, transparency may be defined to a degree to which light reflected from the light guide plate is transmitted and irradiated to the outside.

The front plate 31 may be formed to have color and may be formed to represent different colors according to an operation or on and off states of the lighting device 36. For example, a specific design or pattern may be printed on the front plate 31 to have specific color. A film with a specific design or pattern printed thereon may be added to the front plate 31, surface treatment such as imprinting, etching, and glass printing may be performed on the panel 21, or a coating or deposition layer having specific color and texture may be formed to form an outer appearance of the front plate 31.

The front plate 31 may be configured to transmit light emitted from the lighting device 36 but components behind the front plate 31 may not be seen therethrough. That is, in the state where the lighting device 36 is turned off, components inside the panel assembly 30 may be prevented from being seen to the outside through the front plate 31 due to the color of the front plate 31.

In this case, a color layer 311 having color may be formed on the front plate 31. In an off state, the color layer 311 may be formed to have at least color having brightness equal to or greater than zero other than black. That is, in a state where the refrigerator 1 is installed, the front surface of the refrigerator 1 may be displayed in a color other than black, and the front color of the refrigerator may be changed according to an operation of the lighting device 36.

In the panel assembly 30, the entire front surface of the front plate 31 may be exposed to the outside. Thus, the light diffused by the diffusion member 32 may be transmitted through the front plate 31 as a whole, and thus, the entire front surface of the front plate 31 may glow.

A rear surface of the front plate 31 may be coupled to a front surface of the diffusion member 32.

The light guide plate 33 may be positioned at a rear spaced apart from the front plate 31 by the diffusion member 32 and may be configured to guide light emitted from the lighting device 36 disposed at the upper end of the light guide plate 33 forward.

For example, the light guide plate 33 may be formed of transparent acrylic, plastic, or a transparent polymer material. The light guide plate 33 may have a diffusing agent added thereto for diffusing light entrance on the light guide plate 33 or a pattern for diffusing light may be further formed on the light guide plate 33. Thus, light may be transferred to the front plate 31 by the light guide plate 33, and in this case, a pattern of the light guide plate 33 may be set to cause the entire front surface of the front plate 31 to glow with uniform brightness.

A load of the light guide plate 33 may be supported by the diffusion member 32 and may be pressed toward the diffusion member 32 by the back cover 39.

The diffusion member 32 may be disposed between the front plate 31 and the light guide plate 33. The diffusion member 32 may allow the light guide plate 33 to be maintained at a predetermined distance from the front plate 31 and may diffuse light emitted from the light emission surface of the light guide plate 33.

The front surface of the diffusion member 32 may support the front plate 31 and opposite side surfaces of the diffusion member 32 may restrain both ends of the light guide plate 33. The front surface of the diffusion member 32 may have a size greater than or equal to that of the light guide plate 33, and in the state where the light guide plate 33 is mounted, the rear surface of the diffusion member 32 and the light guide plate 33 may be maintained in the state of being in surface contact with each other.

The diffusion member 32 may include a plate-shaped front surface portion 321, on which the front plate 31 is mounted, and an extension portion extending from a circumference of the front surface portion 321. The front surface portion 321 and the extension portion may define an accommodation space 320*a* in which the light guide plate 33 is disposed.

The extension portion may be disposed to cover the circumference of the light guide plate 33. The circumference of the light guide plate 33 may include, for example, a top surface, a bottom surface, and both side surfaces.

For example, the extension portion may include an upper extension portion 322 extending from an upper end of a rear surface of the front surface portion 321, a lower extension portion 324 extending from a lower end of the rear surface of the front surface portion 321, and a pair of side surface portions 327 and 328 extending from both left and right ends of the front surface portion 321.

The upper extension portion 322, the lower extension portion 324, and the pair of side surface portions 327 and 328 may define the accommodation space 320*a* in which the light guide plate 33 is disposed. Thus, the diffusion member 32 not only serves to diffuse light, but also serves to accommodate and support the light guide plate 33.

The front surface portion 321 may be formed like a plate corresponding to the front plate 31, and a front surface of the light guide plate 33 may be in close contact with a rear surface of the front surface portion 321.

Thus, according to this embodiment, since the front surface portion 321 of the diffusion member 32 is entirely disposed between the front plate 31 and the light guide plate 33, even if the light guide plate 33 is deformed by the heat, the light guide plate 33 may be prevented from being in direct contact with the front plate 31. Thus, it is possible to prevent a dark area such as stains from occurring on the front plate 31.

The front surface portion 321 and the rear surface of the front plate 31 may be coupled to each other by an adhesion portion 313. The adhesion portion 313 may include, for example, a sealant or a double-sided tape.

The side surface portions 327 and 328 may extend backward from right and left side ends of the front surface portion 321 and may be formed to restrain right and left side ends of the light guide plate 33. The side surface portions 327 and 328 may be spaced apart from at least one of both left and right side surfaces of the light guide plate 33. When the light guide plate 33 moves to left and right sides, the side surface portions 327 and 328 may be in contact with at least one surface of both the left and right side surfaces to restrict the at least one surface. When it is considered that the light guide plate 33 is expanded by heat, the side surface portions 327 and 328 may be spaced apart from at least one of the left and right side surfaces of the light guide plate 33.

Each of the upper extension portion 322 and the lower extension portion 324 extends backward from the front surface portion 321, and a length of each of the upper extension portion 322 and the lower extension portion 324 may be greater than a thickness of the light guide plate 33.

The diffusion member 32 may be made of a material for transmitting light therethrough and may be entirely formed by injection or extrusion as a single component.

The diffusion member 32 may be made of a transparent or translucent material as a whole. The diffusion member 32 itself may be provided to have a color. Thus, when viewed from the front of the panel assembly 30, a color, texture, or shape of the front surface of the panel assembly 30 may be determined by the diffusion member 32.

The diffusion member 32 may further include a light guide plate support 326 supporting a bottom surface 333 of the light guide plate 33. The light guide plate support 326 may extend backward from the rear surface of the front surface portion 321 and may be disposed above the lower extension portion 324 to be spaced apart from the lower extension portion 324.

To stably support the load of the light guide plate 33, the diffusion member 32 may include a plurality of light guide plate supports 326. The plurality of light guide plate supports 326 may be disposed to be spaced apart from each other in the horizontal direction.

The lighting device 36 may be accommodated in the diffusion member 32. The diffusion member 32 may include a receiving groove 324*a* (or receiving portion) that receives a portion of the lighting device 36.

The receiving groove 324*a* may be defined as a rear portion of the front surface portion 321 is recessed forward. Thus, the portion in which the receiving groove 324*a* is defined in the front surface portion 321 may be thinner than other portions.

The receiving groove 324*a* may be defined between the light guide plate support 326 and the lower extension portion 324. Thus, when the lighting device 36 is received in the receiving groove 324*a*, the lighting device 36 may be disposed below the light guide plate support 326.

The lighting device 36 may include a substrate 361 and the light source 362. The substrate 361 may be provided in a plate shape to be elongated in the left and right direction.

The plurality of light sources 362 may be arranged at a constant interval on the substrate 361. The light source 362 may be disposed to radiate light toward the bottom surface 333 of the light guide plate 33. That is, the bottom surface 333 of the light guide plate 33 is a light entrance surface, and the front surface 331 of the light guide plate 33 is the light emission surface.

The substrate 361 may provide a space in which the light source 362 may be continuously disposed from the left end to the other side end of the light guide plate 33. At least one of the left and right ends of the substrate 361 may be restricted from moving in the left and right direction by the side surface portions 327 and 328 of the diffusion member 32.

The light source 362 may be disposed vertically below the bottom surface 333 of the light guide plate 33, i.e., may be disposed to face the bottom surface 333 of the light guide plate 33.

The light source 362 may be provided as, for example, an LED. The light source 362 may be configured as an RGB LED capable of irradiating light with various colors according to a control of the controller 13, which will be described later. That is, the light source 362 may emit light with various colors under control of the controller 13 that will be described later, and thus the front plate 31 may glow with color set by the controller 13. A color of the front appearance of the refrigerator 1 may be determined according to color of the front plate 31.

The light source 362 may include an LED for emitting light with specific color other than the RGB LED and may include a combination of a plurality of LEDs for emitting light with different colors. For example, the plurality of light sources 362 may include red, green, and blue LEDs and may sequentially and repeatedly arranged. Under control of the controller 13, operations of the light sources 362 may be combined to cause the front plate 31 to glow with desired color.

An interval between the light sources 362 may be less than the right and left width of the light guide plate support 326, and thus the light guide plate support 326 may be disposed between the light sources 362. Thus, the light emitted from the light source 362 may pass between two adjacent light guide plate supports 326 and be irradiated to the bottom surface 333 of the light guide plate 33.

The panel assembly 30 may further include a substrate supporter 37 seated on the lower extension portion 324 of the diffusion member 32.

The substrate supporter 37 may support the substrate 361 while being seated on the lower extension portion 324. A substrate supporter 37 may dissipate heat generated by the lighting device 36 by thermal conduction.

The substrate supporter 37 may be made of, for example, a metal material. For example, the substrate supporter 37 may be made of an aluminum material having high thermal conductivity. The substrate supporter 37 may be extruded with a metal material to have the same cross-sectional shape in the longitudinal direction.

A portion of the substrate supporter 37 may be received in the receiving groove 324*a*. The substrate supporter 37 may be in contact with the back cover 39 while the back cover 39 is assembled. Thus, the heat generated by the lighting device 36 may be transferred toward the back cover 39 through the substrate supporter 37 and may be dissipated through the back cover 39.

The panel assembly 30 may further include a rear supporter 34 supporting the rear surface of the light guide plate 33. The rear supporter 34 may be provided in a plate shape and may be attached to the rear surface of the light guide plate 33 by an adhesive.

The rear supporter 34 may be made of an opaque material through which light transmission is restricted. The rear supporter 34 may be accommodated in the accommodation space 320*a* defined by the diffusion member 32. The upper extension portion 322 may cover an upper side of the rear supporter 34, and the side portions 327 and 328 may cover both the side surfaces of the rear supporter 34.

A bottom surface of the rear supporter 34 may be disposed above the substrate 361. For example, a bottom surface of the rear supporter 34 may be seated on a top surface of the substrate 361.

In this case, the upward movement of the substrate 361 may be restricted by the rear supporter 34. Since the bottom surface 333 of the light guide plate 33 is seated on the top surface of the light guide plate support 226, a set interval may be maintained between the bottom surface of the light guide plate 33 and the light source 362.

As described above, the lighting device 36 may be maintained in the fixed state, and a distance between the light guide plate 33 and the light source 362 may also be maintained at a set distance, and thus, the light irradiated from the light source 362 may be incident into the light guide plate 33 at a designed angle. Thus, the light irradiated from the light source 362 may be effectively irradiated toward the light guide plate 33, and the light reflected through the light guide plate 33 may allow the front plate 31 to glow with set brightness.

In another aspect, the rear supporter 34 may be seated on the light guide plate support 326.

The rear supporter 34 may include an opening 342 through which a portion of the back cover 39 passes.

The back cover 39 may include a cover body 391 and a bent portion extending from an edge of the cover body 391 in the horizontal direction.

The cover body 391 may be in contact with the rear surface of the rear supporter 34. The cover body 391 may be attached to the rear supporter 34 by the adhesive or may be coupled to the rear supporter 34 by a coupling member such as a screw.

The bent portion may extend forward from the edge of the cover body 391 and may include an upper bent portion 393, a lower bent portion 396, and a pair of side bent portions 394 and 395. The bent portion may be in contact with the diffusion member 32. For example, the bent portion may adhere to the extension portion of the diffusion member 32 by the adhesive.

For example, the upper bent portion 393 may be seated in an upper seating groove 323 having a recessed shape defined in the upper extension portion 322 of the diffusion member 32.

The lower bent portion 396 may be in contact with a bottom surface of the lower extension portion 324 of the diffusion member 32. The side bent portions 394 and 395 may be seated in the recessed side seating grooves 327*a* and 328*b* defined in the side extension portions 327 and 328.

In this embodiment, since the diffusion member 32 supports the light guide plate 33 and fixes a position of the light guide plate 33, and the back cover 39 is coupled to surround a portion of the diffusion member 32, the number of components of the panel assembly 30 itself may be reduced to reduce a thickness of the panel assembly in the front and rear direction.

The cover body 391 may further include a pressing portion 392 bent toward the light guide plate 33. The pressing portion 392 may pass through the opening 342 of the rear supporter 34 so as to be in contact with the rear surface of the light guide plate 33.

In this embodiment, the cover body 391 may press the rear supporter 34 toward the rear surface side of the light guide plate 33 while being in contact with the rear surface of the rear supporter 34, and the pressing portion 392 may directly press the light guide plate 33.

The receiving groove 324*a* may be defined at a position equal to or lower than that of the bottom surface 311 of the front plate 31. That is, a portion of the front surface portion 321 may extend further downward than the bottom surface 311 of the front plate 31.

The diffusion member 32 may diffuse the light irradiated from the light emission surface of the light guide plate 33. Since a portion of the diffusion member 32 is disposed lower than the bottom surface 311 of the front plate 31, there is a possibility that the light passing through the diffusion member 32 is directly irradiated to the outside without passing through the front plate 31. To prevent this phenomenon, the panel assembly 30 according to this embodiment may further include a lower trim 35.

The lower trim 35 may be coupled to the diffusion member 32 by a coupling means such as an adhesion portion or a hook.

The lower trim 35 may include a first portion 351 extending in the vertical direction and a second portion 352 extending in the horizontal direction from a lower end of the first portion 351. At least the first portion 351 may be provided to be transparent or translucent and, as necessary, may be provided with a specific color.

The first portion 351 may cover a portion of the diffusion member 32 extending downward from the bottom surface 311 of the front plate 31. For example, the first portion 351 may be disposed to face the receiving groove 324*a* in front of the receiving groove 324*a* in the diffusion member 32.

The second portion 352 may support the lower extension portion 324. The second part 352 may include a seating groove 393 for seating the lower bent portion 396 of the back cover 39.

Figure 6:
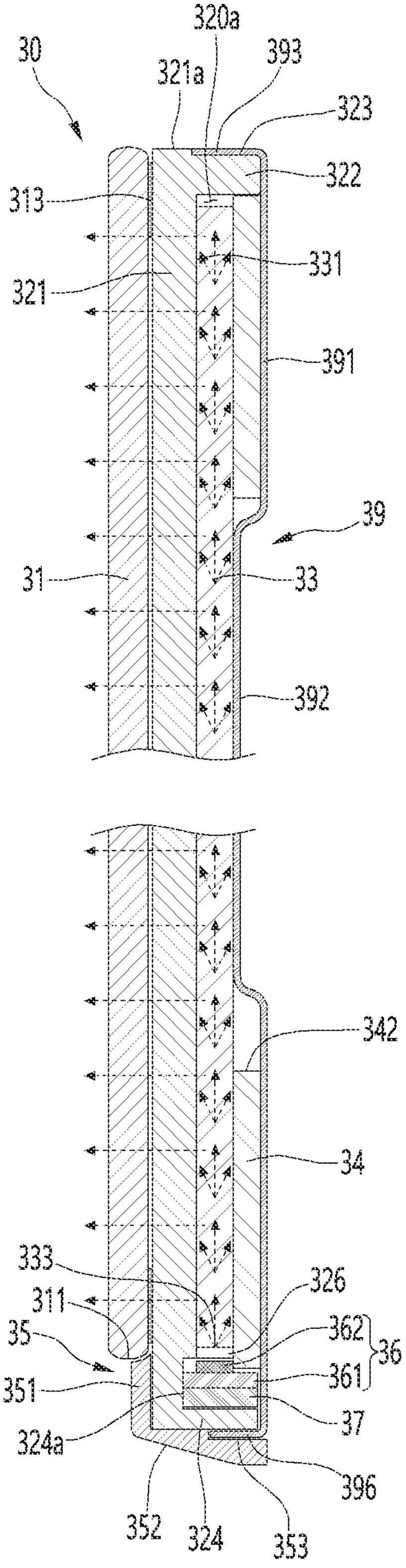
FIG. 6 is a vertical cross-sectional view illustrating a light emitting state of the panel assembly.
Figure 7:
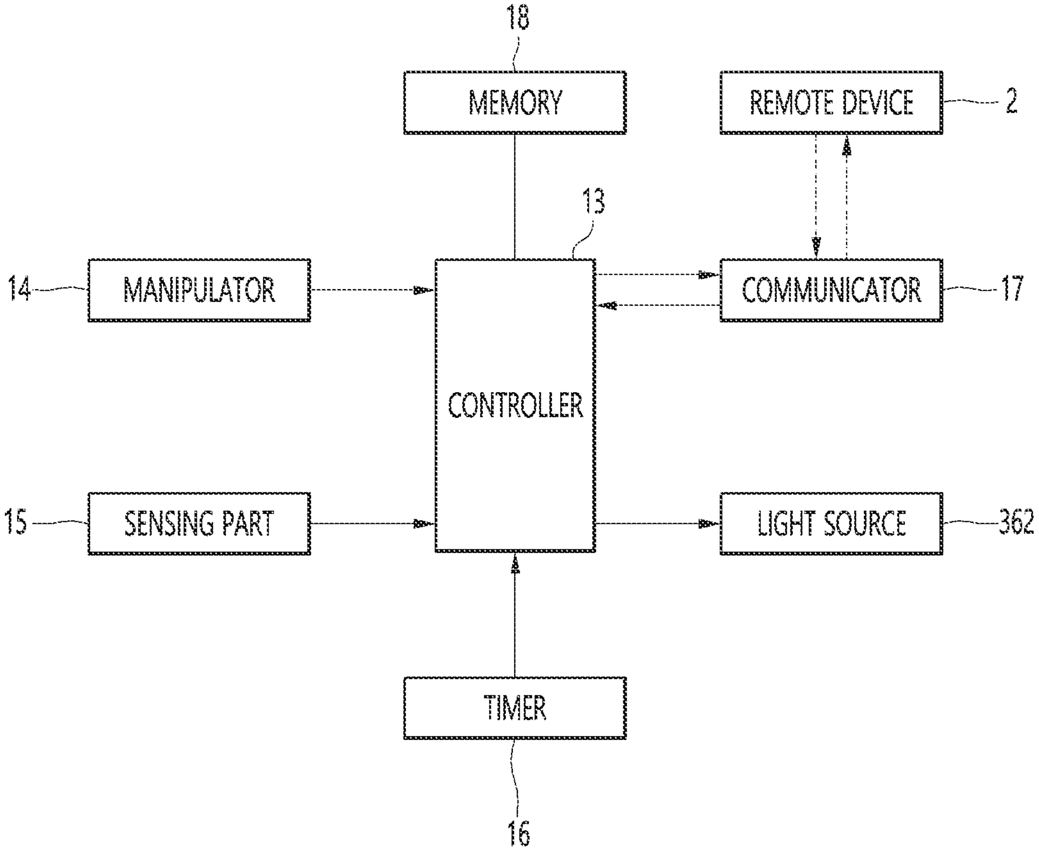
FIG. 7 is a block diagram illustrating a flow of a control signal of the refrigerator.
Figure 8:
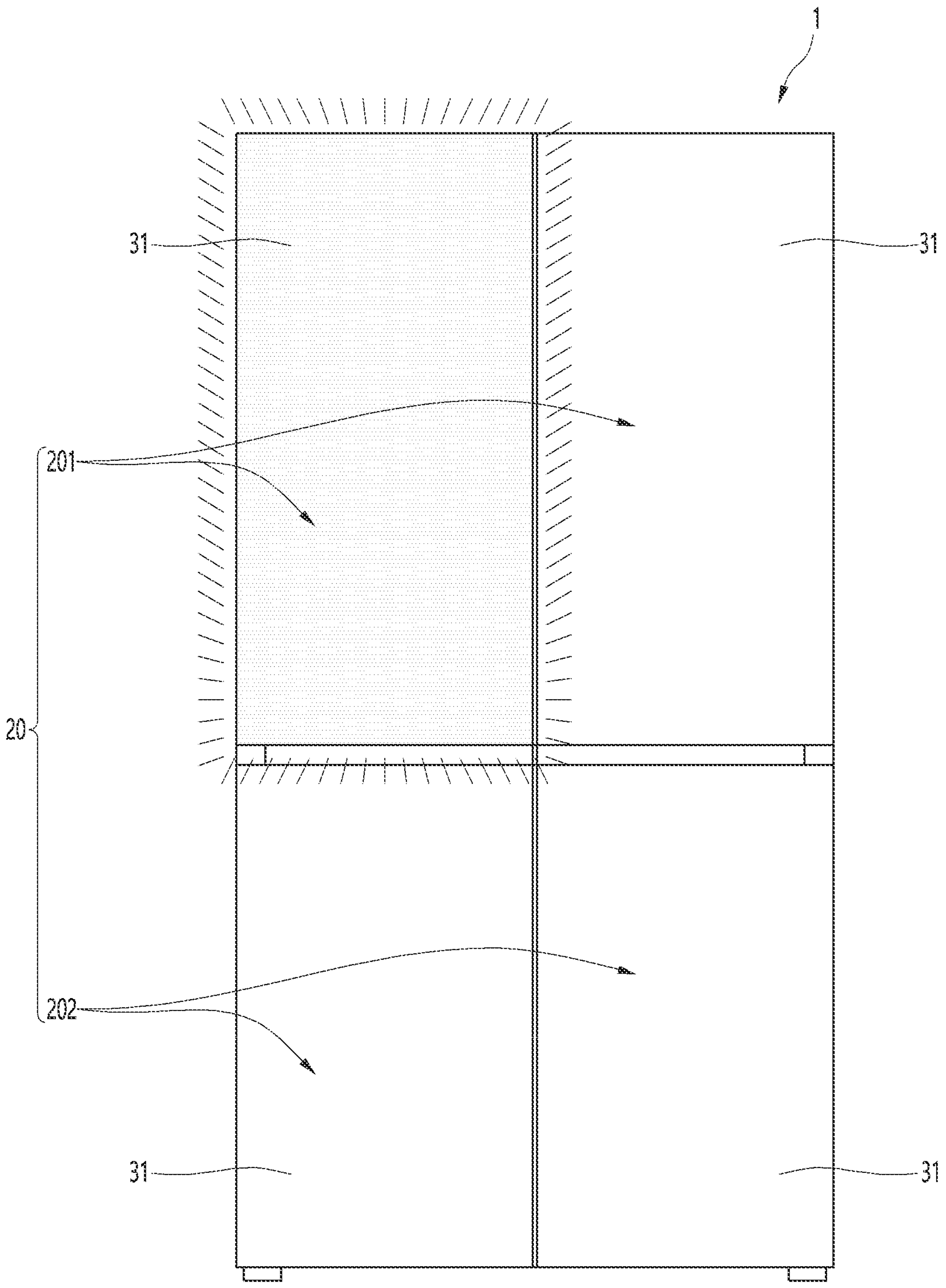
FIG. 8 is a view illustrating a state where all doors in a refrigerator emit light.
Figure 9:
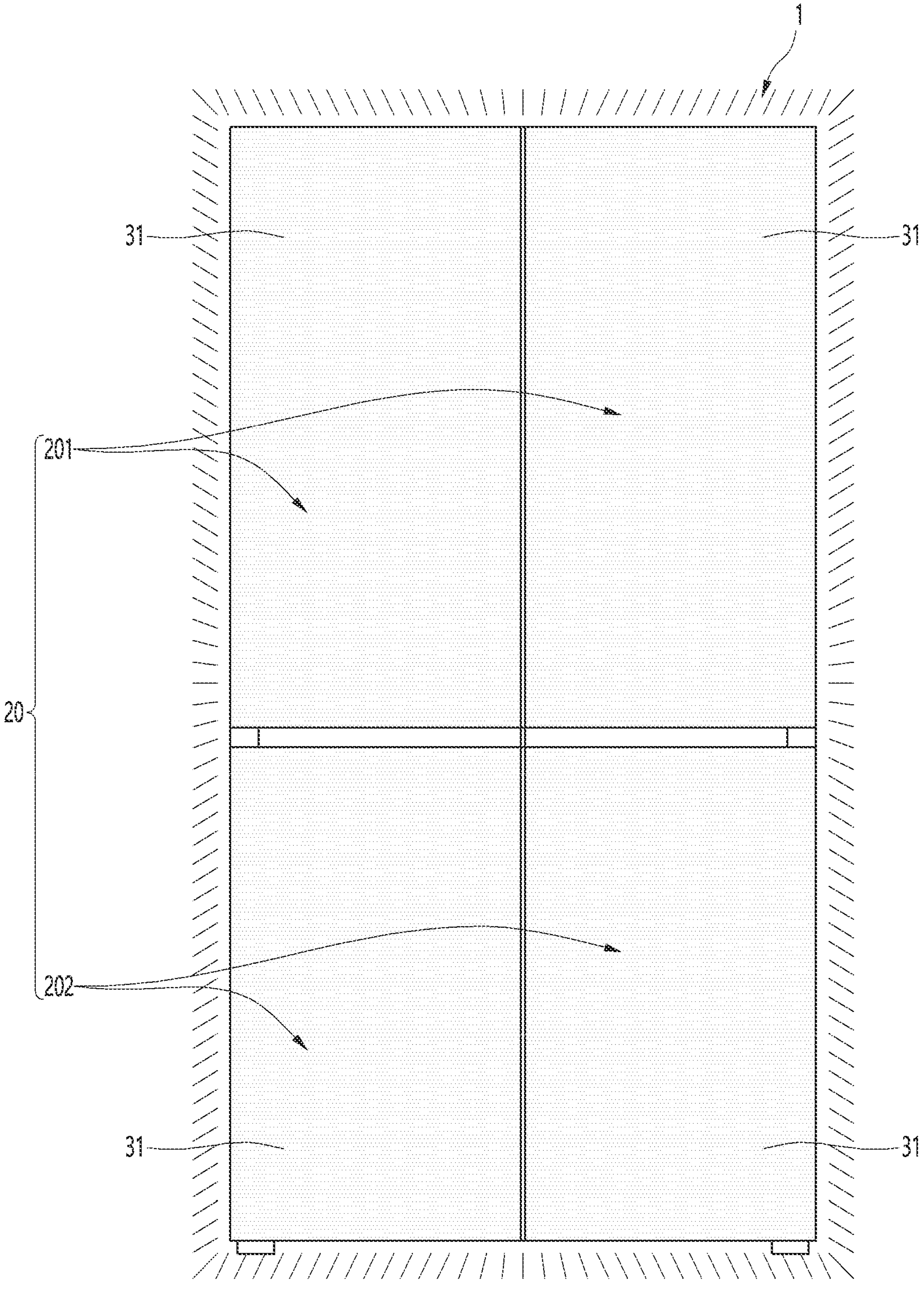
FIG. 9 is a view illustrating a state where some of a plurality of doors emit light.

FIG. 6 is a vertical cross-sectional view illustrating a light emitting state of the panel assembly, FIG. 7 is a block diagram illustrating a flow of a control signal of the refrigerator, FIG. 8 is a view illustrating a state where all doors in a refrigerator emit light, and FIG. 9 is a view illustrating a state where some of a plurality of doors emit light.

Referring to FIGS. 6 to 9, as illustrated in the drawings, in the refrigerator 1 according to an embodiment of the present disclosure, a front surface of the door 20 may glow via an operation of the lighting device 36.

The front surface of the door 20 may be turned on or off and may glow with any one of a plurality of colors under control of the controller 13.

The operation of the lighting device 36 may be performed by manipulation of a manipulator 14 of a user. The manipulator 14 may be disposed at one side of the refrigerator 1, and for example, may be disposed at one side of the cabinet 10. Needless to say, as necessary, the manipulator 14 may be included in the door 20 or command may be input by touching and manipulating the front plate 31. That is, the user may directly manipulate the manipulator 14 to set an operation of the lighting device 36 and may turn on or off the lighting device 36.

The user may set an operation state of the lighting device 36, such as an operation time and an operation condition of the lighting device 36 and emission color of the light source 362 through manipulation of the manipulator 14. Various commands related to the operation of the refrigerator may be input by manipulating the manipulator 14. As necessary, the manipulator 14 may be configured as a display for information display and manipulation.

The lighting device 36 may also be manipulated in operation and set in operation condition through a remote device 2 spaced apart from the refrigerator 1. The refrigerator 1 may communicate with the remote device 2 through a communicator 17 connected to a controller 13, and the user may control an operation of the lighting device 36 through the remote device 2.

The communicator 17 may communicate with the remote device 2 in various ways. As an example, the communicator

17 may have a structure capable of communicating in at least one of wired, wireless, and short-range communication (Bluetooth, Wi-Fi, Zigbee, NFC, or the like). The remote device 2 may be a variety of devices capable of communication, such as a dedicated terminal, mobile phone, tablet, portable PC, desktop PC, remote control, or Bluetooth speaker.

The user may manipulate and set the operation state of the lighting device 36, such as an operation time and an operation condition of the lighting device 36 and emission color through manipulation of the remote device 2. For example, the lighting device 36 may be simply manipulated and set through an application or a dedicated program installed in a portable phone of the user.

The lighting device 36 may also be operated by a detecting result of a sensing part 15.

The sensing part 15 may include, for example, a user detection sensor 151 for detecting proximity of the user. For example, the user detection sensor 151 may use various devices for detecting user approaching near the refrigerator, such as an infrared sensor, an ultrasonic sensor, or a laser sensor.

The user detection sensor may be disposed at various positions for detecting proximity of the user, such as one side of the cabinet 10 or one side of the door 20, and may be disposed at various positions for detecting proximity of the user. A plurality of sensors may be disposed at different positions.

Thus, when the user approaches the refrigerator 1 by a set distance for use of the refrigerator 1, the user detection sensor 151 may detect this and may transfer a signal to the controller 13 to turn on the lighting device 36. When the user moves away from the refrigerator 1, the user detection sensor 151 may detect this and may transfer a signal to the controller 13 to turn off the lighting device 35.

The sensing part 15 may be a door opening and closing sensing part that detects the opening and closing of the door 20. When the opening of the door 20 is detected by the sensing part 15, the controller 13 may operate the lighting device 36 or change the operating state thereof.

The sensing part 15 may detect the opening and closing of each of the plurality of doors. The sensing part 15 may detect the opening and closing of the door 20 as well as at least one of the rotation direction, rotation speed (angular velocity), and rotation angle of the door 20.

For example, the sensing part 15 may include, for example, an acceleration sensor or a gyro sensor. Using this sensor, the detection of the opening of the door 20, the opening angle of the door 20, the opening speed of the door 20, the closing speed of the door 20, the closing of the door 20, or the like may be possible.

When the closing of the door 20 is detected by the sensing part 15, the controller 13 may change the state of the lighting device 36.

When the opening of the door 20 is detected by the sensing part 15, the timer 16 may be activated, the opening time of the door 20 is measured by the timer 16, and the measured opening time of the door 20 may be stored in the memory 18.

The controller 13 may control the operation of the lighting device 36 based on the opening time of the door 20 measured by the timer 16.

The operation state of the lighting device operated by the controller 13 is now described. As shown in FIG. 6, when the lighting device 36 is turned on according to an instruction of the controller 13, light emitted from the light source 362 may be directed toward the bottom surface 333 of the light guide plate 33 and then guided along the light guide plate 33.

In this case, the light guided by the light guide plate 33 may pass through the light emission surface and be diffused while passing through the front surface portion 321, and then, may pass through the front plate 31 and be transmitted to the outside. Thus, the entire front plate 31 may brightly glow, and the front surface of the door 20 may glow with a set brightness or color.

The lighting device 36 may be turned on to cause the front surface of the door 20 to glow brightly, and the front surface of the door 20 may glow with set color by light emitted from the source 362. In this case, the front color of the door 20 may be different color or brightness from in the state where the lighting device 36 is turned off.

That is, a color of the front surface of the door 20 may be seen as a color of the front plate 31, and the texture and pattern disposed on the front plate 31 may be seen. In this case, the color of the front plate 31 may be color with a brightness greater than 0 and may be formed in a color other than black. The color of the front surface of the door 20 in the state where the lighting device 36 is turned may also be referred to as a first color (or a background color).

Thus, the front surface of the door 20 may be seen with color of the front plate 31, and in this case, components inside the panel assembly 30 may be seen through the front plate 31 and may not be seen to the outside by the color of the front plate 31.

In this state, the lighting device 36 may be turned on, and when the lighting device 36 is turned on, the front surface of the door 20 may glow with color set by the controller 13.

The front surface of the door 20 may be controlled to glow in a second color different from the first color, and the lighting device 36 may control the light source 362 so that the door 20 may glow in the second color according to the control of the controller 13.

At this time, the color emitted from the light source 362 may be different from the second color. That is, since the front plate 31 contains the first color, if light of the second color is emitted from the light source 362, the light may interact with the first color in the process of passing through the front plate 31 and thus the door 20 may actually glow with a third color.

Therefore, in this embodiment, controlling the light source 362 to emit a specific color from the door 20 may actually means controlling the color emitted from the light source 362 by considering the color of the front plate 31 itself.

That is, when the light source 362 is turned on, the color glowing from the door 20 may be a mixture of the color of the front plate 31 and the color of the light emitted from the light source 362.

Some of the plurality of doors 20 forming the front appearance of the refrigerator 1 may emit light or the plurality of doors 20 may independently emit light to form the front appearance of the refrigerator 1 with set color.

The refrigerator 1 may be operated to cause some doors 20 of a plurality of doors to glow or glow with specific color. That is, all the lighting devices 36 included in the doors 20 may not be operated, but instead, only some of all the doors 20 may glow. For example, any one door 201*a* of the refrigerating compartment door 201 may glow.

As necessary, the left refrigerating compartment door 201*a* and the right refrigerating compartment door 201*b* may glow with different colors. At least two of the doors 20 may be sequentially changed in color and at least two of the doors 20 may be sequentially turned on or off.

In this case, the lighting device 36 included in the panel assembly 30 may be controlled by the controller 13 according to the aforementioned various conditions.

The refrigerating compartment door or the freezing compartment door among the doors may be controlled to glow with different colors.

The controller 13 may control the lighting device 36 to cause one pair of the refrigerating compartment doors 201 to be seen with the first color. The controller 13 may control the lighting device 36 to cause one pair of the refrigerating compartment doors 201 to be seen with the second color.

That is, the refrigerating compartment door 201 and the freezing compartment door 202 may be distinguished therebetween with colors, and according to a temperature change inside the refrigerator, the colors of the refrigerating compartment door 201 and the freezing compartment door 202 may also be changed.

Thus, through the front color of the door 20, the user may intuitively recognize an operation state of each storage space as well as may distinguish between the refrigeration compartment and the freezing compartment.

Hereinafter, operation control of the lighting device 36 according to opening and closing of the door 20 will be described.

For convenience of explanation, the two doors on the upper side of the refrigerator are referred to as the first door 211 and the second door 212, and the two doors on the lower side of the first and second doors are referred to as the third door 213 and the fourth door 214.

In the case of the upper first door 211 and the second door 212, the light source 362 may be located below each of the first door 211 and the second door 212. In the case of the lower third door 213 and fourth door 214, the light source 362 may be located above the third door 213 and fourth door 214, respectively. Of course, it is also possible for the light source 362 to be located below each of the third door 213 and the fourth door 214.

Additionally, operation control of the lighting device 36 described below is not limited to the structure of the panel assembly described above. That is, at least one of the plurality of components constituting the panel assembly may be omitted, at least one of the plurality of components may be replaced with the different component, or the position of at least one of the plurality of components may be changed. For example, at least one of the light guide plate or diffusion member may be omitted, and the position of the lighting device may be changed.

Figure 10:
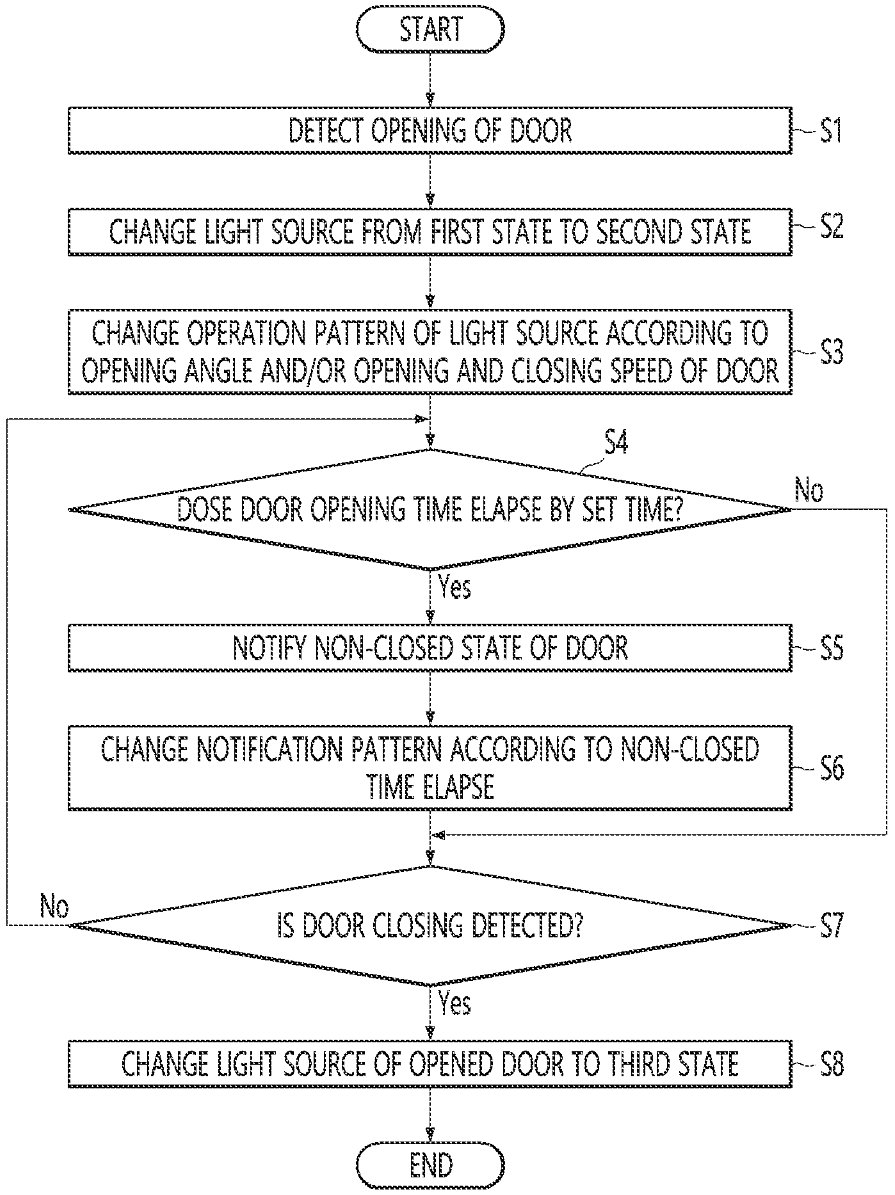
FIG. 10 is a flowchart illustrating a method for controlling a light source according to a door opening process according to the first embodiment.
Figure 11:
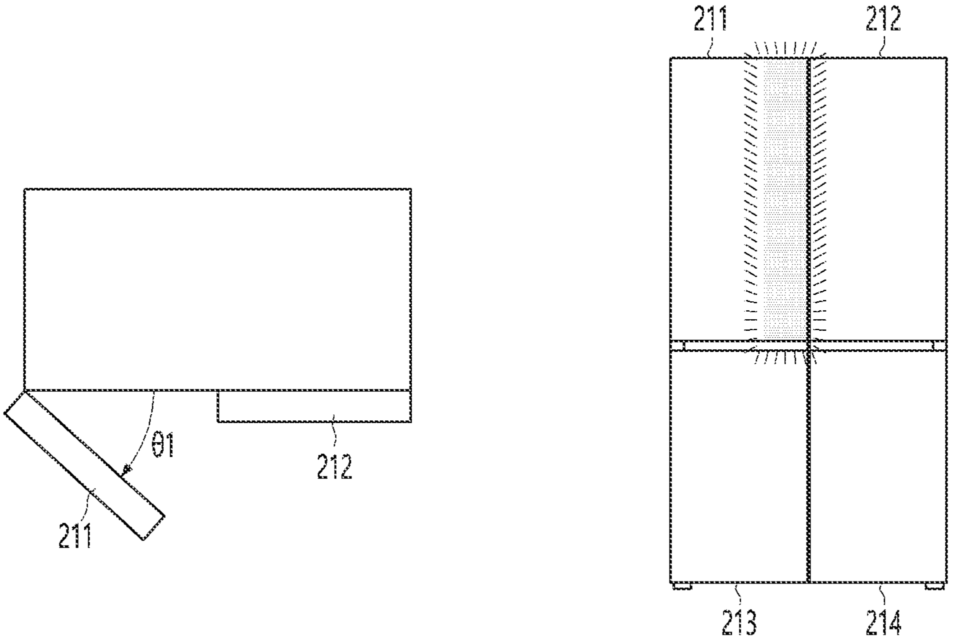
FIG. 11 is a view illustrating the operation of a light source according to the opening angle of the door.
Figure 11:
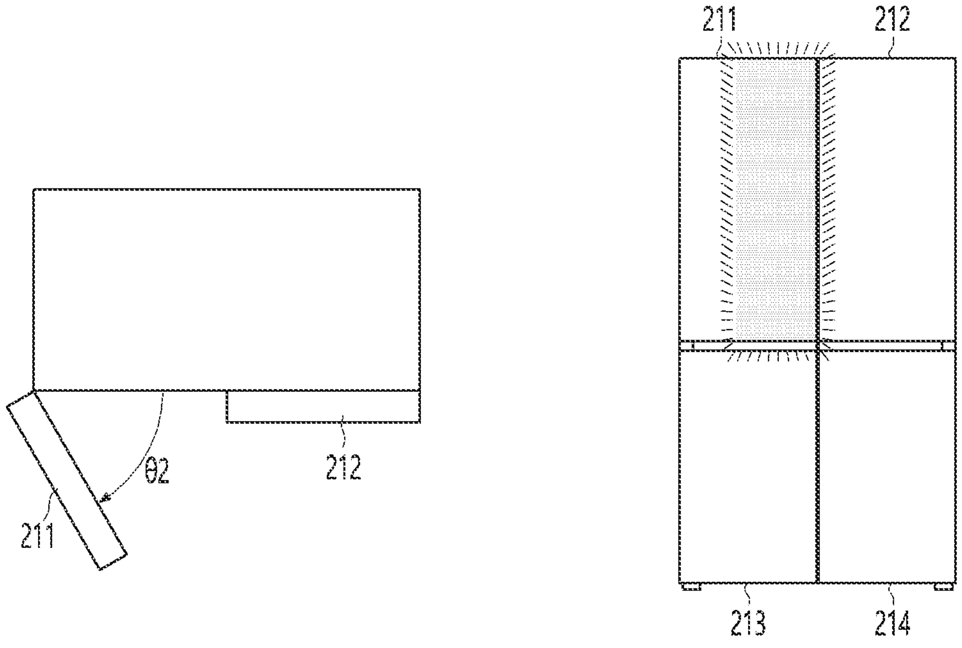
Figure 12:
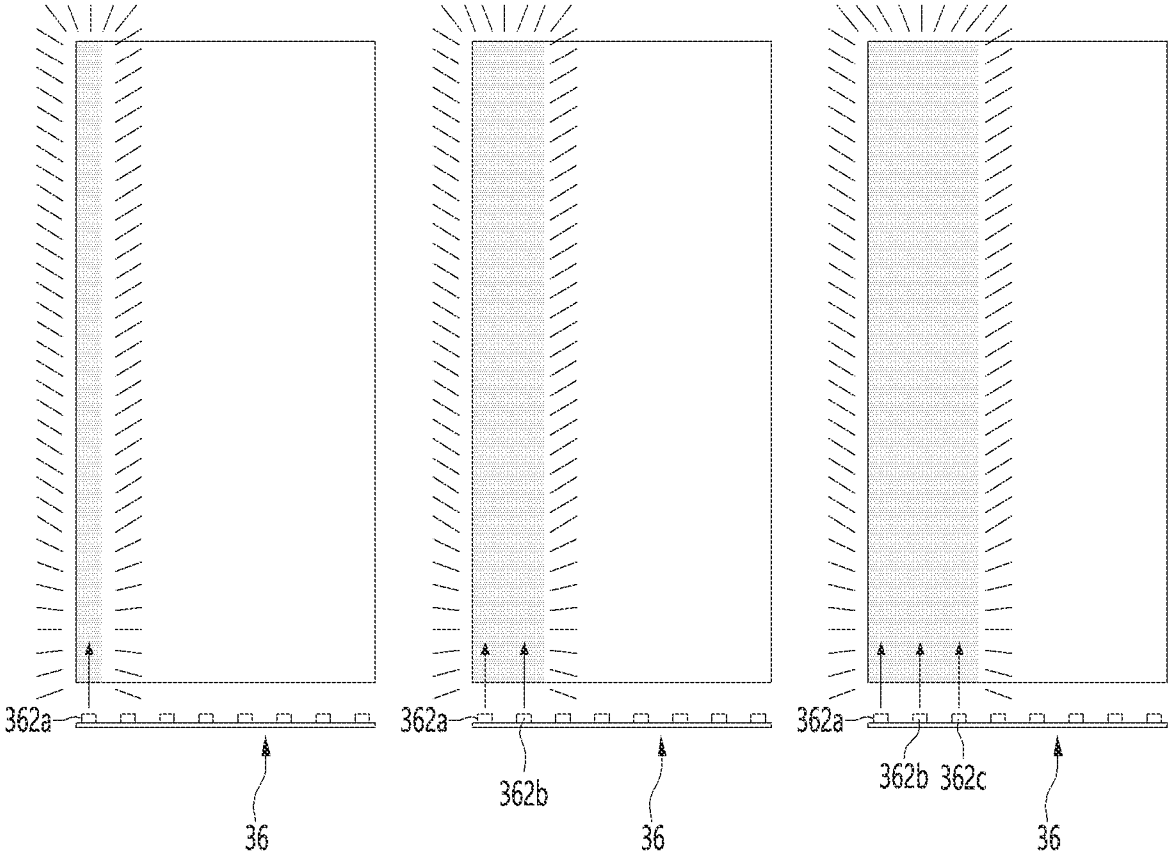
FIG. 12 is a view illustrating an embodiment for controlling a plurality of LEDs constituting a light source.
Figure 13:
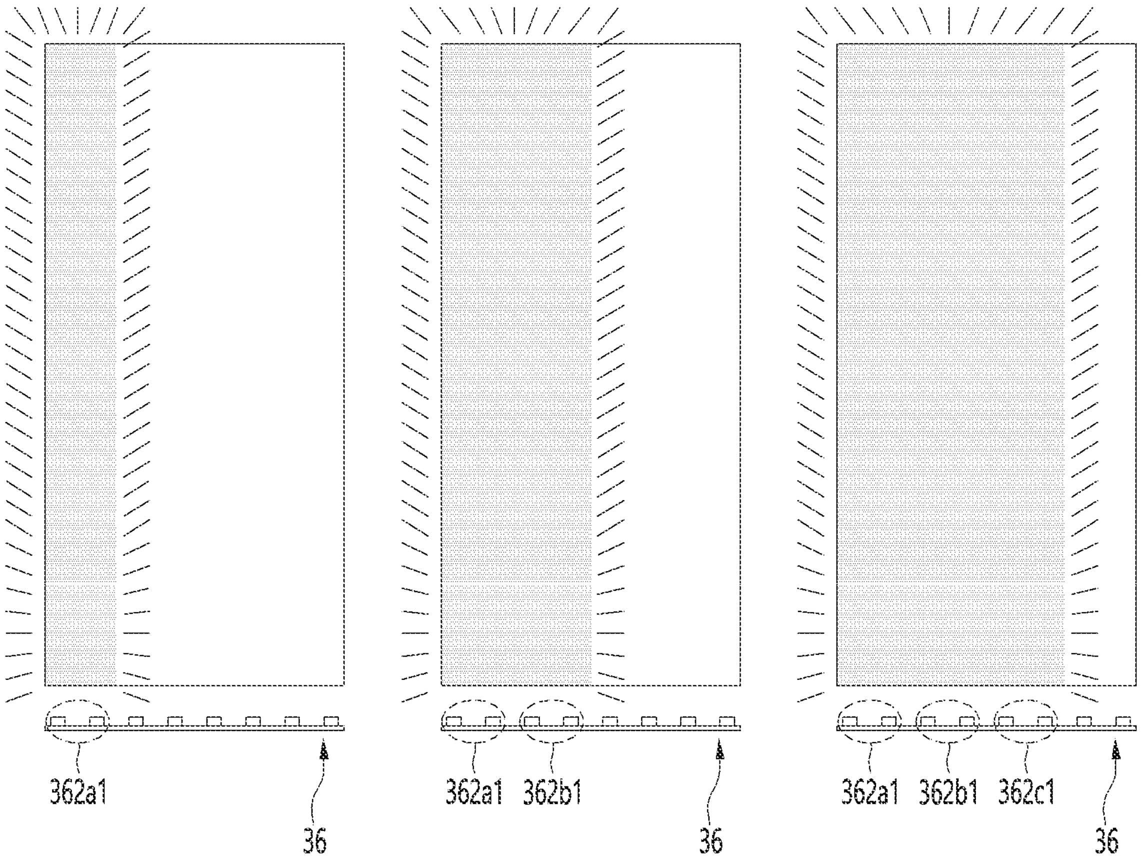
FIG. 13 is a view illustrating another embodiment for controlling a plurality of LEDs constituting a light source.

FIG. 10 is a flowchart illustrating a method for controlling a light source according to a door opening process according to the first embodiment, FIG. 11 is a view illustrating the operation of a light source according to the opening angle of the door, FIG. 12 is a view illustrating an embodiment for controlling a plurality of LEDs constituting a light source, and FIG. 13 is a view illustrating another embodiment for controlling a plurality of LEDs constituting a light source.

Referring to FIGS. 7 and 10 to 13, the opening of the door 20 may be detected by the sensing part 15 in a state in which the door 20 is closed (S1). In the drawing, the first door 211 is shown as open for easy understanding.

When, for example, the opening of the first door 211 is detected by the sensing part 15, the controller 13 may control the light source 362 of the opened first door 211 so that the light source 362 changes from the first state to the second state (S2).

When the opening of the first door 211 is detected, the timer 16 may operate.

In this specification, changing the state of the light source 362 may include at least one of changing the light source 362 from an off state to a on s, changing the light source 362 from an on state to an off state, turning on of at least one LED while the light source 362 is in off state, turning off of the light source 362 while at least one LED is turned on, changing the brightness of the light emitted from the light source 362 while the light source 362 is turned on, changing the brightness or color of the light emitted from some of the plurality of LEDs while the light source 362 is turned on, changing the number of LEDs that are turned on (increasing the number of LEDs that are turned on or decreasing the number of LEDs that are turned on), and changing the color of light emitted from the light source 362 while the light source 362 is turned on.

The on state of the light source 362 means that all of the plurality of LEDs are on, and the off state of the light source 362 means that all of the plurality of LEDs are off.

Hereinafter, for example, the first state is a state where the light source 362 is turned off, and the second state is a state where at least one of the plurality of LEDs of the light source 362 is turned on.

When the opening of the first door 211 is detected, at least one LED constituting the light source 362 of the first door 211 may be turned on. When at least one LED is turned on, a specific color may glow on the front surface of the open first door 211, so the user can easily recognize that the first door 211 is currently open.

When the first door 211 is opened, the sensing part 15 may detect at least one of the rotation direction, opening angle, and opening and closing speed of the first door 211.

The controller 13 may change the operating state or pattern of the light source 362 according to the opening angle and/or opening and closing speed of the first door 211 (S3).

That is, the controller 13 may control the light source 362 of the first door 211 according to the opening of the first door 211.

For example, referring to FIG. 11, when the first door 211 is opened by a first angle θ1, the first area of the first door 211 may glow.

When the first door 211 is opened by a second angle θ2 greater than the first angle, the second area of the first door 211 may glow. The second area may be an area larger than the first area while including the first area.

That is, as the opening angle of the first door 211 increases, the number of LEDs that are turned on may increase.

Referring to FIG. 12, in order to change the glowing area in the first door 211, the controller 13 may individually control each of the plurality of LEDs.

In the case of FIG. 12, the light source 362 is shown to exemplarily include eight LEDs, and in order to vary the glowing area in the first door 211, the first LED 362*a*, the second LED 362*b*, and the third LED 362*c* may be turned on sequentially. However, it should be noted that there is no limit to the number of LEDs in this embodiment.

Alternatively, referring to FIG. 13, a plurality of LEDs may be grouped into a plurality of groups.

In order to vary the glowing area in the first door 211, the controller 13 can individually control a plurality of groups. Each group may include two or more LEDs.

In the case of FIG. 13, the light source 362 exemplarily includes 8 LEDs, and the 8 LEDs are shown to be divided into four groups. However, it should be noted that in this embodiment, there is no limit to the number of LEDs and the number of groups.

The controller 13 may sequentially turn on the first LED group 362*a*1, the second LED group 362*b*1, and the third LED group 362*c*1 in order to change the glowing area in the first door 211. At this time, two or more LEDs in each LED group may be interconnected.

When managing a plurality of LEDs as a group, there is an advantage that the number of signals generated by the controller 13 may be reduced. On the other hand, when a plurality of LEDs are individually controlled, the number of areas that may be expressed in the first door 211 may be increased, and there is an advantage in that the areas may be subdivided and controlled.

In this embodiment, when the first door 211, which is the left door, is opened, the glowing area may increase from the right side to the left side of the first door 211. On the other hand, when the second door 212, which is the right door, is opened, the glowing area may increase from the left to the right of the second door 212.

Additionally, when the first door 211, which is the left door, is closed, the glowing area from left to right of the first door 211 may be reduced. On the other hand, when the second door 212, which is the right door, is closed, the glowing area from the right to the left of the second door 212 may be reduced.

That is, in relation to step S3, when one of the two adjacent doors in the left and right directions is opened, the glowing area may increase in a direction away from the portion close to the other adjacent door. Additionally, when one of the two adjacent doors in the left and right directions is closed, the glowing area may be reduced from the far side toward the other adjacent door.

Alternatively, in relation to step S3, according to the opening speed of the first door 211, the turning-on interval of the LEDs or LED groups that are sequentially turned on may be reduced or increased.

For example, if the opening speed of the first door 211 is slow, the time interval until the first LED 362*a* is turned on and the second LED 362*b* is turned on, or the time interval until the first LED group 362*a*1 is turned on and the second LED group 362*b*1 is turned on may be large.

On the other hand, if the opening speed of the first door 211 is fast, the time interval until the first LED 362*a* is turned on and the second LED 362*b* is turned on, or the time interval between the first LED group 362*a*1 is turned on and the second LED 362*b* is turned on may be small.

The rotation direction of the first door 211 may be detected by the sensing part 15. When the first door 211 is opened at a certain angle and then rotated in a closed direction, that is, when the opening angle of the first door 211 is reduced, the number of turned-on LEDs or the number of turned-on LED groups may decrease.

The first door 211 may be opened by a limited angle (or maximum opening angle), and when the first door 211 is opened by the limited angle, all LED of the light sources 362 of the first door 211 are opened may be turned on.

The limiting angle of each door may vary according to the type of refrigerator or the location where the refrigerator is installed, and the limiting angle of each door may be preset and stored in the memory 18. However, the limit angle for each door may be changed.

The limiting angle of the door may be an angle at which the door may be maximally opened without interference from surrounding structures when the refrigerator is placed in a specific position.

If a user opens the door beyond the limit angle, there is a risk that the door may collide with surrounding structures.

In the case of this embodiment, the glowing area of the door varies according to the opening angle of the door, so the user may easily check the angle that may be additionally opened from the current opening angle of the door by checking the glowing area of the door and may also easily check whether the door is currently open to the limit angle.

Meanwhile, after the door is opened, the controller 13 may determine whether the door opening time has elapsed a set time (or reference time) (S4).

The first door 211 is opened, and the timer 16 may accumulate the time that the first door 211 has been opened. If the controller 13 determines that the accumulated time has elapsed the set time, the controller 13 can control the light source 362 of the door 20 so that the non-closed state of the door is notified (S5).

For example, the controller 13 may control the light source 362 of the open first door 211, or control the light source 362 of at least one doors of the plurality of doors 212, 213, and 214 in the closed state.

The controller 13 may control the light source 362 so that the notification pattern changes according to the elapse of non-closed time (S6). A method for notifying the non-closed state of the door will be described later with reference to the drawings.

The controller 13 may determine whether closing of the door is detected after the door has been opened (S7). For example, the sensing part 15 may detect the closing of the first door 211.

When the closing of the first door 211 is detected, the controller 13 may control the light source 362 of the open door so that the light source 362 changes to the third state (S8).

For example, the controller 13 may control the light source 362 of the opened first door 211 so that the light source 362 changes from the current state to the third state.

When the first door 211 is opened, the state of the light source 362 is changed to the second state, and the state of the light source 362 changes to various states by changing the opening angle of the first door 211.

After the first door 211 is opened, while the state of the light source 362 is changing in various ways, when the closing of the first door 211 is detected, the light source 362 may be changed from the current state to the third state.

Changing from the current state of the light source 362 of the first door 211 to the third state may include at least one of, for example, changing the light source 362 from an off state to an on state, changing the light source 362 from an on state to an off state, turning on of at least one LED while the light source 362 is turned off, turning off of the light source 362 while at least one LED is turned on, changing the brightness of the light emitted from the light source 362 while the light source 362 is turned on, changing the brightness or color of the light emitted from some of the plurality of LEDs while the light source 362 is turned on, changing the number of LEDs that are turned on (increasing the number of LEDs that are turned on or decreasing the number of LEDs that are turned on) and changing the color of light emitted from the light source 362 when the light source 362 is turned on.

At this time, in terms of user visibility, when the closing of the first door 211 is detected, it may be desirable for the light source 362 of the first door 211 to be turned on for a certain period of time and then turned off. That is, the user can easily recognize that the first door 211 was opened and then closed. When the predetermined time elapses while the light source 362 of the first door 211 is turned on, the light source 362 may be turned off immediately, or the brightness of the light emitted from the light source 362 may decrease and then be turned off.

As another example, when the closing of the first door 211 is detected, the color of light emitted from the light source 362 of the first door 211 may be determined based on the temperature of the storage space.

For example, if the opening time of the first door 211 is long, the temperature of the storage space increases, so the compressor operates to lower the temperature of the storage space. When the compressor operates, the light source 362 may operate so that the first door 211 emits light to notify the operation of the compressor. The light source 362 may be turned off when a set time has elapsed.

At this time, when the closed door is a refrigerating compartment door, the light source 362 of the remaining refrigerating compartment doors other than the first door 211 may also be operated. On the other hand, when the closed door is a freezing compartment door, the light source 362 of the remaining freezing compartment doors other than the first door 211 may also be operated.

Alternatively, when the first door 211 is closed, the light sources 362 of all doors may be operated.

Figure 14:
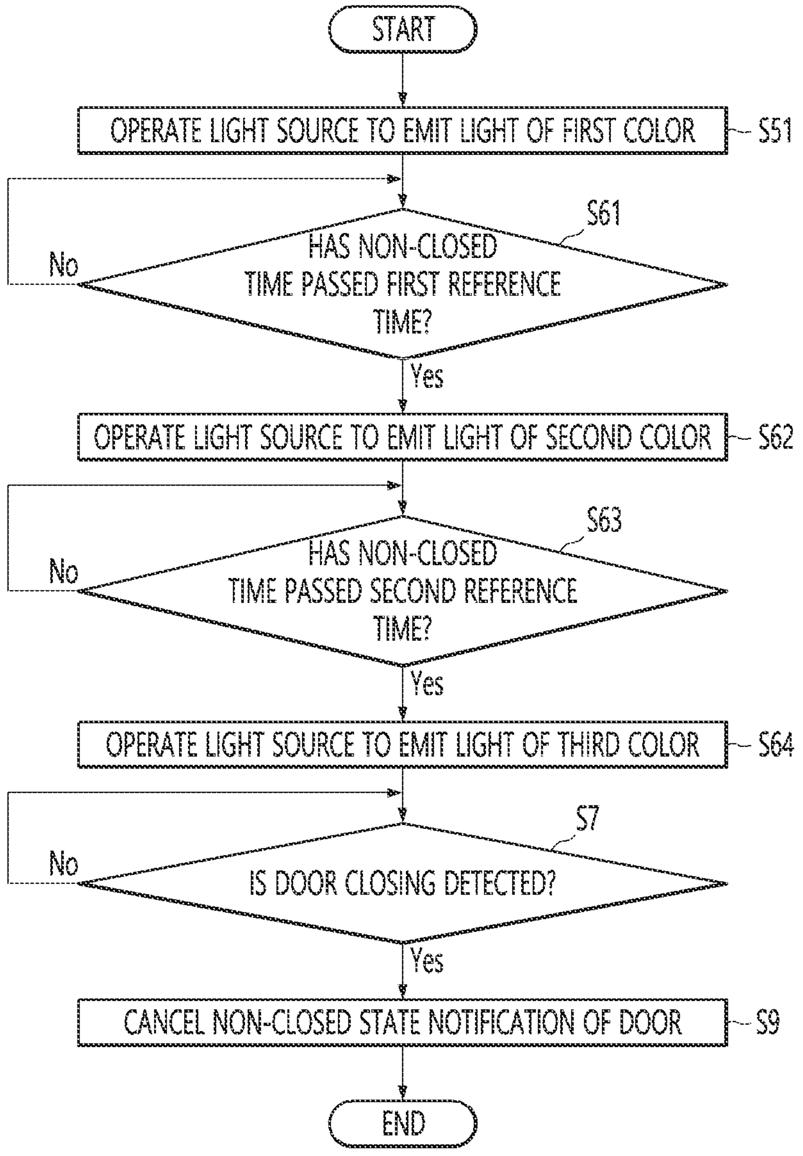
FIG. 14 is a diagram illustrating a method for controlling the non-closed notification of the door according to the first embodiment.

FIG. 14 is a diagram illustrating a method for controlling the non-closed notification of the door according to the first embodiment.

Referring to FIGS. 11 and 14, as described above, after the door is opened, the operation pattern of the light source 362 may change according to the opening angle and/or opening and closing speed of the door.

For example, based on the current open state of the first door 211, the light source 362 of the first door 211 may be operated to emit light of the first color (S51).

In this state, the controller 13 may determine whether the non-closed time of the first door 211 has elapsed the first reference time (S61).

As a result of determination in step S61, if the non-closed time of the first door 211 has not elapsed the first reference time, the light source 362 of the first door 211 may remain in an on state so that the light source 362 continuously emits light of the first color.

Alternatively, the light source 362 may be repeatedly turned on and off so that light of the first color is emitted from the light source 362 at first time intervals.

As a result of the determination in step S61, when the non-closed time of the first door 211 elapses the first reference time, in order to notify the non-closed state of the door, the controller 13 may control the light source 32 so that the light source 362 of the first door 211 and/or the light source 362 of at least on door of the plurality of closed doors in the surrounding area (S62).

The user can recognize that the first door 211 is currently maintained in a non-closed state by changing the color of the light source 362 of the first door 211 or operating the light source of a closed door in the surrounding area. For example, one of the closed doors in the surrounding area may be a door arranged in a horizontal direction with the open door or a door arranged in a vertical direction with the open door.

If one door is opened, one or more doors of the closed doors may be selected, and thus the light source of the selected door may be operated.

At this time, among the closed doors, the doors may be selected in the following order: a door arranged in a horizontal direction with the open door, a door arranged in a vertical direction with the open door, and a door arranged in a diagonal direction with the open door.

For example, when activating the light source of one of the closed doors, the light source of the adjacent door may be activated in the horizontal direction, and when activating the light source of each of the two closed doors, the light source of each of the doors arranged in a horizontal direction with the open door and the door arranged in a vertical direction with the open door may be operated.

If three or more doors are opened together, only the light source of the opened doors may operate.

In step S62, the light source 362 may be maintained in an on state so that the light source 362 continuously emits light of the second color.

Alternatively, the light source 362 may be repeatedly turned on and off so that light of the second color is emitted from the light source 362 at second time intervals. By changing the color of the light source 362, the user recognizes that the first door 211 and/or at least one doors of a plurality of closed doors in the surrounding area glow at regular time intervals, and thus the user may easily recognize that the first door 211 is maintained in a currently non-closed state. The second time interval may be equal to or less than the first time interval.

The controller 13 may determine whether the non-closed time of the first door 211 has elapsed the second reference time (S63).

As a result of the determination in step S63, if the non-closed time of the first door 211 elapses the second reference time, the controller 13 may control the light source 362 so that the light source 362 of the first door 211 and/or the light source 362 of at least one doors of the plurality of closed doors in the surrounding area operates to emit light of a third color (S64).

In step S64, the light source 362 may be maintained in an on state so that the light source 362 continuously emits light of the third color.

Alternatively, the light source 362 may be repeatedly turned on and off so that light of a third color is emitted from the light source 362 at third time intervals. The user recognizes that the first door 211 glows at regular intervals by changing the color of the light source 362 and/or that at least one doors of a plurality of closed doors in the surrounding area glows at regular time intervals and thus may easily recognize that the first door 211 is currently maintained in a closed state for a long time. At this time, the third time interval may be equal to or less than the second time interval.

As another example, while the light source 362 continuously emits light of the third color in step S64, if the non-closed time of the first door 211 elapses the third reference time, the light source 362 may operate so that the light sources of all doors emit light of a third color continuously or intermittently (at fourth time intervals). The fourth time interval may be equal to or less than the third time interval. The time interval described above may be manually set and changed by the user.

As in this embodiment, as the non-closed time of the door increases and the color emitted from the light source 362 changes, there is an advantage that the user may easily recognize the non-closed state of the door by recognizing the color change of the door.

In the case of a general refrigerator, the refrigerator includes a notification part (a member that generates a sound such as a buzzer or speaker) to notify when the door is opened for a set time, and since the refrigerator of this embodiment includes a general notification part and the light for the non-closed notification of the door is emitted from the door itself, there is an advantage that the non-closed state of the door may be easily recognized by looking at the light of the door in situations where the sound notification from the notification part is not recognized or is difficult to recognize.

Of course, it is also possible that the refrigerator of this embodiment does not include a general notification part.

In this embodiment, the non-closed state notification step of the door (S5) and the notification pattern change step (S6) in FIG. 10 may include steps S61 to S64 in FIG. 14.

Meanwhile, the controller 13 determines whether the closing of the door is detected (S7), and when it is determined that the closing of the door is detected, the light source 362 may be controlled so that the non-closed state notification of the door is canceled (S9). When the non-closed state notification of the door is canceled, for example, the light source 362 may be turned off. Alternatively, when the non-closed state notification of the door is canceled, the light source 362 may be turned off after the delay time has elapsed. For example, if the closing of the door is detected while the light source 362 is operating to emit light of the third color in step S64, the light source 362 may be turned off after the delay time has elapsed.

As another example, the step S62 may be replaced by emitting light of the second color by the light source 362 of the first door 211 and controlling the light source 362 of at least one doors of the plurality of closed doors in the surrounding area so that the light area 362 emits a fourth color different from the second color.

The step S64 may be replaced by emitting light of the third color by the light source 362 of the first door 211 and controlling the light source 362 of at least one doors of the plurality of closed doors in the surrounding area so that the light area 362 emits a fifth color different from the third color.

In FIG. 14, it is described that the color of the light source changes as the opening time of the door increases, as an example, but, unlike this, the brightness of the light emitted from the light source may change, or the number of the LED or LED group operating in a plurality of LEDs or LED groups may be also variable.

For example, step S51 may be replaced with a step in which the light source is operated to emit light of a first color at a first intensity. Step S62 may be replaced with a step in which the light source is operated to emit light of the first color at a second intensity. Alternatively, step S64 may be replaced with a step in which the light source is operated to emit light of the first color at a third intensity. Alternatively, step S64 may be replaced with a step in which the light source is operated to emit light of the second color. That is, it is possible to mix changes in the color of the light source and changes in the brightness of the light.

The change in the state of the light source includes changing the state of the light source of the open door and/or changing the state of the light source of at least one doors of the plurality of closed doors in the surrounding area.

As another example, step S51 may be replaced with a step in which A LEDs or A LED groups of a plurality of LEDs or LED groups are operated. Additionally, step S62 may be replaced with a step in which B LEDs or B LED groups of a plurality of LEDs or LED groups are operated. B is bigger than A. Additionally, the step may be replaced with a step in which C LEDs or C LED groups of a plurality of LEDs or LED groups are operated. C is bigger than B. In this example, the color may be maintained or varied in the process of increasing the number of LEDs or groups of LEDs that are turned on. Alternatively, the color may be maintained and the brightness may be varied while the number of LEDs or the number of LED groups increases.

As another example, steps S63 to S64 in FIG. 14 may be omitted.

Figure 15:
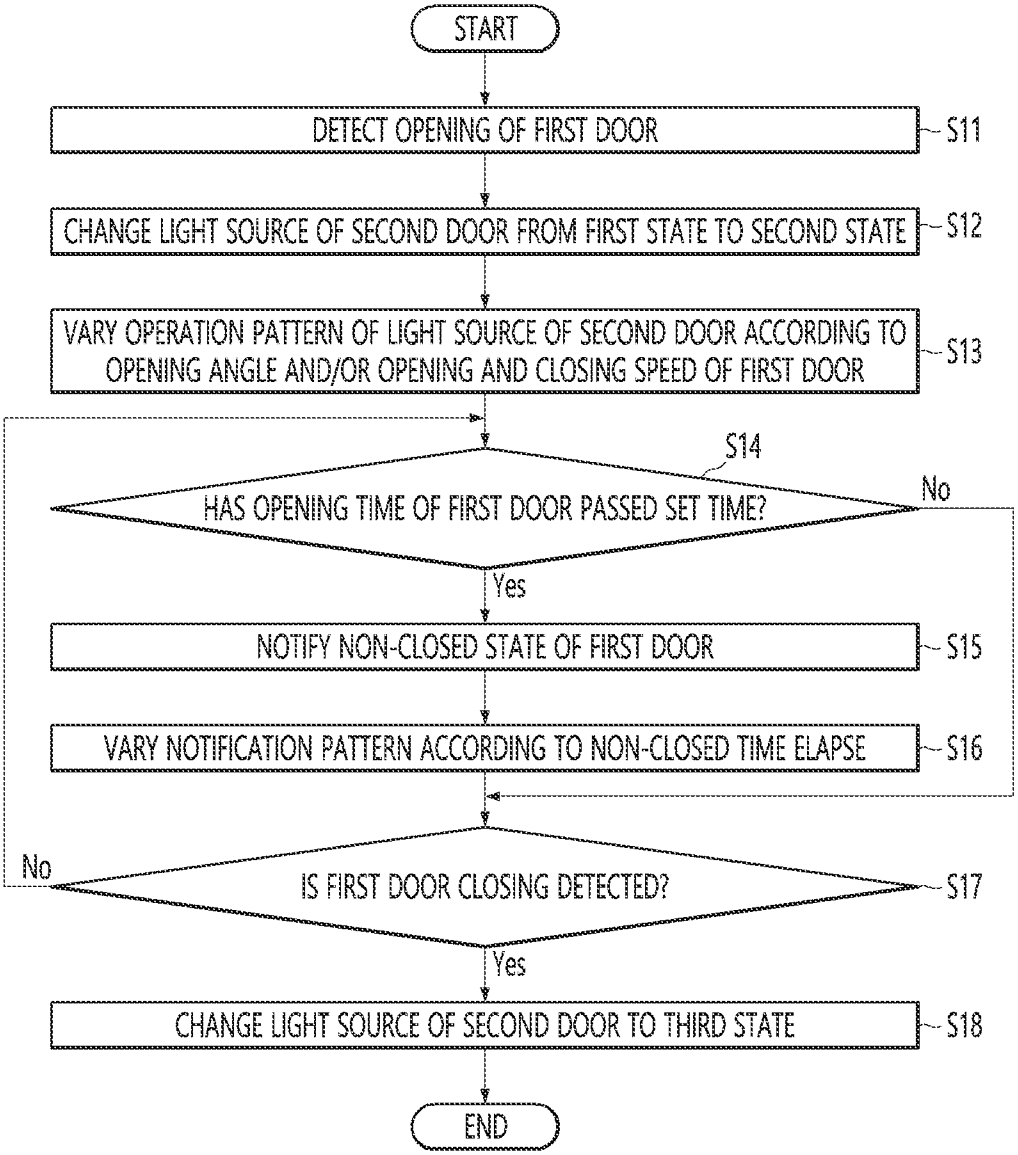
FIG. 15 is a flowchart illustrating a method for controlling a light source according to a door opening process according to a second embodiment.
Figure 16:
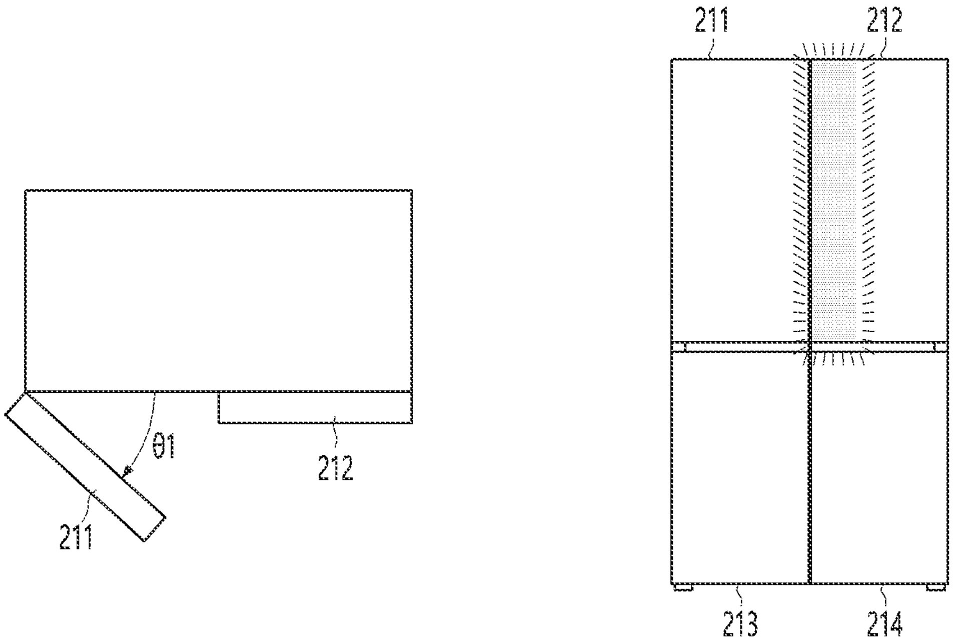
FIG. 16 is a view illustrating the operation of the light source according to the opening angle of the door.
Figure 16:
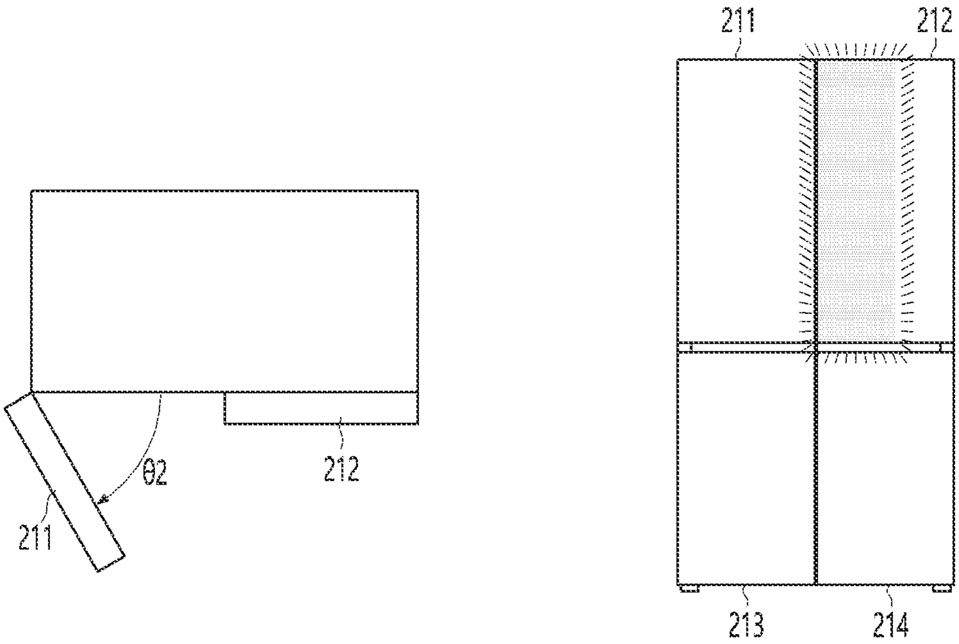

FIG. 15 is a flowchart illustrating a method for controlling a light source according to a door opening process according to a second embodiment, and FIG. 16 is a view illustrating the operation of the light source according to the opening angle of the door.

This embodiment is the same as the first embodiment in other respects, but the difference is that the target of the door that lights up when the first door is opened is different. Therefore, hereinafter, only the characteristic parts of this embodiment will be described.

Referring to FIGS. 15 and 16, for example, the opening of the first door 211 may be detected by the sensing part 15 (S11).

The controller 13 may control the light source 362 so that the light source 362 of at least one door 212 of the plurality of closed doors 212, 213, and 214 around the open first door 211 is changed from the first state to the second state (S12).

For example, FIG. 16 shows that the operation of the light source 362 of the opened first door 211 and the second door 212 arranged in the horizontal direction is controlled.

When the opening of the first door 211 is detected, the timer 16 may operate.

In this specification, the state change of the light source 362 of the second door 212 may be the same as the state change of the light source 362 of the first door 211 described above in the first embodiment, so detailed description is omitted.

Hereinafter, for example, it is described that the first state is a state where the light source 362 is turned off and the second state is a state where at least one of the plurality of LEDs of the light source 362 is turned on.

When the opening of the first door 211 is detected, at least one LED constituting the light source 362 of the second door 212 may be turned on. When at least one LED is turned on, a specific color may glow on the front surface of the second door 212 adjacent to the open first door 211, so the user can easily recognize that the first door 211 is currently open.

In this embodiment, the first door 211 is opened by rotation, so the angle between the front surface of the first door 211 and the user's eyes can be changed. As the opening angle of the first door 211 increases, the angle between the front surface of the first door 211 and the user's eyes increases, thereby lowering the visibility of the front surface of the first door 211.

Therefore, in this embodiment, the open state of the first door 211 is displayed on the second door 212, and thus there is an advantage that the open state of the first door 211 may be easily checked regardless of the opening angle of the first door 211.

When the first door 211 is open, the sensing part 15 can detect at least one of the rotation direction, opening angle, and opening and closing speed of the first door 211. The controller 13 may change the operating state or pattern of the light source 362 of the second door 212 according to the opening angle and/or opening and closing speed of the first door 211 (S13).

For example, referring to FIG. 16, when the first door 211 is opened by a first angle θ1, the first area of the second door 212 may glow.

When the first door 211 is opened by a second angle θ2 that is larger than the first angle, the second area of the second door 212 may glow. The second area may include the first area and be larger than the first area.

That is, as the opening angle of the first door 211 increases, the number of LEDs that are turned on may increase.

For example, when the first door 211 is opened, the glowing area of the second door 212 may increase in a direction away from the portion adjacent to the first door 211. When the first door 211 is closed, the glowing area of the second door 212 may be reduced from a portion of the second door 212 that is far from the first door 211 to a direction closer to the first door 211.

Since the description of step S3 described in the previous first embodiment can be equally applied to step S13 of the present embodiment, detailed description will be omitted.

Meanwhile, after the door is opened, the controller 13 may determine whether the door opening time has elapsed a set time (or reference time) (S14).

The first door 211 is opened, and the timer 16 may accumulate the time that the first door 211 has been opened. If the controller 13 determines that the accumulated time has elapsed the set time, it may control the light source 362 of the door 20 so that the non-closed state of the door is notified (S15).

For example, the controller 13 may control the light source 362 of the open first door 211, or control the light source 362 of at least one doors of the plurality of doors 212, 213, and 214 in the closed state.

The controller 13 may control the light source 362 so that the notification pattern changes according to the elapse of non-closed time (S16). As for the method for notifying the non-closed state of the door, the content described in FIG. 14 of the first embodiment can be applied as is, detailed description thereof will be omitted.

The controller 13 may determine whether closing of the first door 211 is detected after the first door 211 is opened (S18).

When the closing of the first door 211 is detected, the controller 13 may control the light source 362 of the second door 212 so that the light source 362 changes to the third state (S18).

In step S18, the content of the state change of the light source 362 in step S8 described in the first embodiment may be applied as is, and thus detailed description thereof will be omitted.

When the first door 211 is opened and the state of the light source of the second door 212 changes, the state of the light source of the first door 211 may be changed in the same or different pattern.

Figure 17:
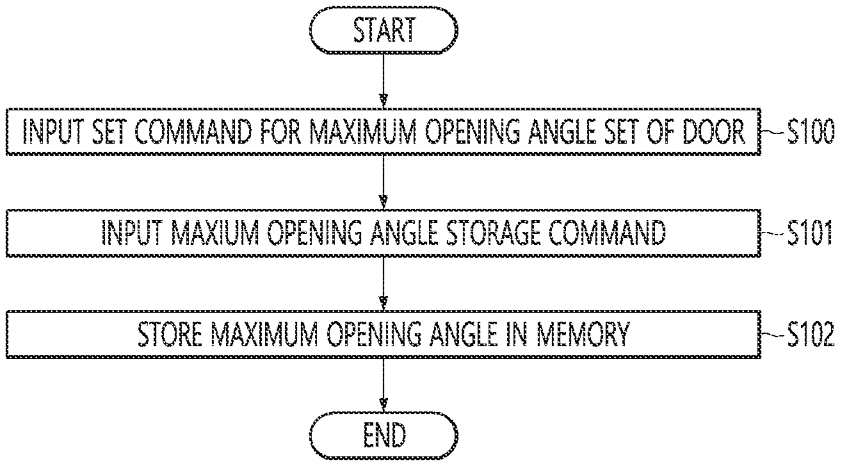
FIG. 17 is a flowchart illustrating a method for setting the maximum opening angle of a door according to the first embodiment.

FIG. 17 is a flowchart illustrating a method for setting the maximum opening angle of a door according to the first embodiment.

Referring to FIG. 17, the maximum opening angle of the door of the refrigerator of this embodiment may vary according to the installation location.

In this embodiment, the light source may be controlled based on the opening angle of the door, and since the light source includes a plurality of LEDs or LED groups, the method for controlling the light source may be different according to the maximum opening angle of the door.

Accordingly, it may be necessary to set the maximum opening angle of the door, and the operation of the light source may be controlled based on the set maximum opening angle.

In this embodiment, the user can manually set the maximum opening angle of the door.

For example, the user may open the first door 211 to set the maximum opening angle of the first door 211. Then, the sensing part 15 may detect the opening of the first door 211 (S200).

The user may open the first door 211 to the maximum opening angle. As the user increases the opening angle of the first door 211, the sensing part 15 can detect the current opening angle of the first door 211.

The controller 13 may determine whether a command to store the maximum opening angle has been input (S101).

For example, the user may input the storage command using the manipulator 14 of the first door 211 or the manipulator 14 of the closed doors 212, 213, and 214 in the surrounding area.

Alternatively, at least one of the doors 211, 212, 213, and 214 may be equipped with a knock detection sensor to detect a user's knock. With the first door 211 opened to the maximum opening angle, the user can input the storage command by knocking on the door equipped with the knock detection sensor.

Alternatively, the storage command may be input through the remote device 2. For example, the remote device 2 may include an application that may monitor or control the operation of the refrigerator. After executing the application, a storage command may be input by selecting a button to input the maximum opening angle of the door.

When it is determined that the storage command is input, the controller 13 determines that the current opening angle of the first door 211 detected by the sensing part 15 is the maximum opening angle, and determines the memory 18 (S102). The maximum opening angle stored in the memory 18 may be transmitted to a server (not shown) provided by the manufacturer of the home appliance 1 and stored in the server.

The home appliance 1 may communicate with a remote device 2 as well as a server (not shown) provided by the manufacturer of the home appliance 1 through the communicator 17, and Information set or stored in the home appliance 1 (for example, the maximum opening angle of the door) may be transmitted to the server and managed by the server.

As another example, the maximum opening angle of the doors can be selected or input on the application of the remote device 2 without opening the door. The maximum opening angle of the doors set in the remote device 2 may be transmitted directly to the refrigerator 1 or transmitted via the server. The maximum opening angle of the doors set in the remote device 2 may also be stored in the server. The home appliance may receive information on the maximum opening angle of the door from the server at regular time intervals. If information on the maximum opening angle of the door is not received from the server, the maximum opening angle information stored in the memory 18 may be used.

When the maximum opening angle of the door is set in this way, the light source may be controlled based on the maximum opening angle set for each door.

For example, if the set maximum opening angle of the door is 80 degrees and the number of LEDs is 8, the number of LEDs that are turned on may increase by one each time the opening angle increases by 10 degrees.

Alternatively, if the maximum opening angle of the set door is 80 degrees and the number of LED groups is 4, the number of LED groups that are turned on may increase by one each time the opening angle increases by 20 degrees.

Alternatively, if the set maximum opening angle of the door is 100 degrees and the number of LEDs is 8, the number of LEDs that are turned on may increase by one each time the opening angle increases by 12.5 degrees. Alternatively, if the maximum opening angle of the set door is 100 degrees and the number of LED groups is 4, the number of LED groups that are turned on may increase by one each time the opening angle increases by 25 degrees.

Figure 18:
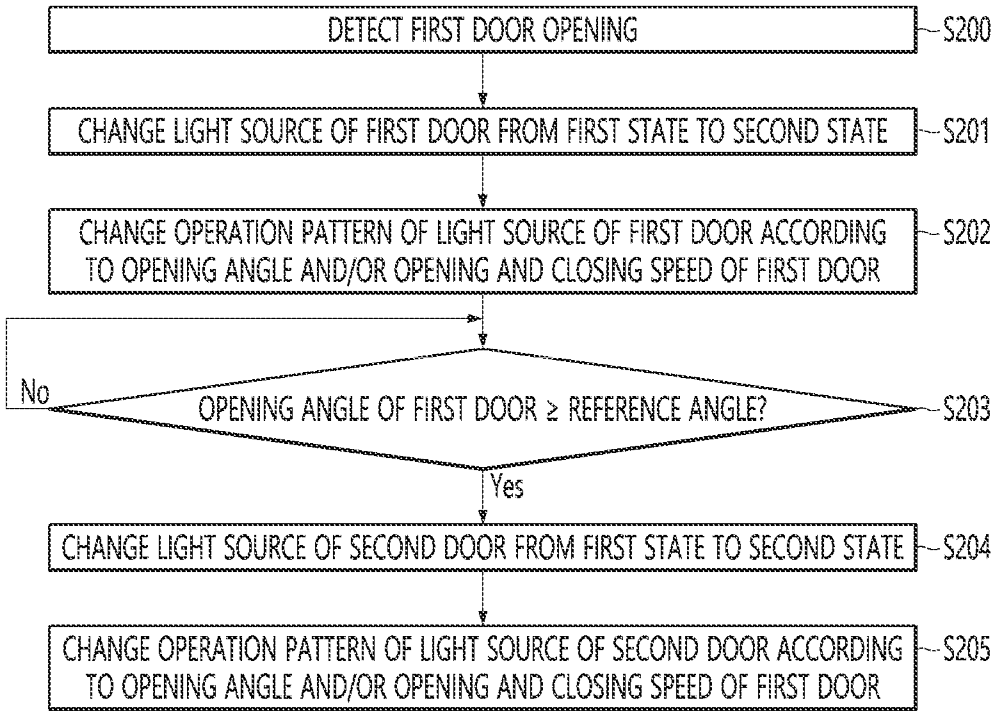
FIG. 18 is a flowchart illustrating a method for controlling a light source according to a door opening process according to a second embodiment.
Figure 19:
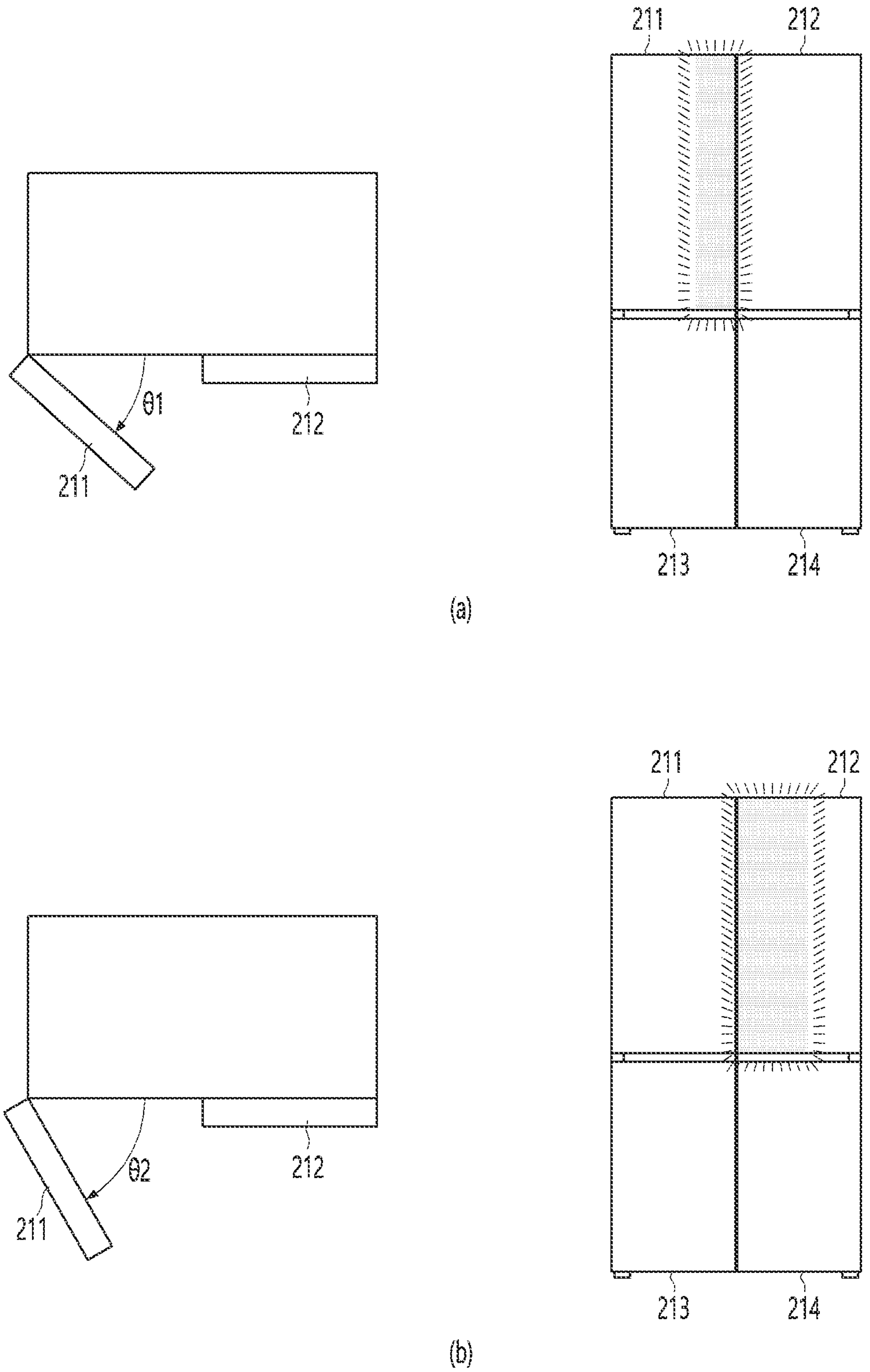
FIG. 19 is a view illustrating the operation of the light source according to the opening angle of the door.

FIG. 18 is a flowchart illustrating a method for controlling a light source according to a door opening process according to a second embodiment, and FIG. 19 is a view illustrating the operation of the light source according to the opening angle of the door.

This embodiment is characterized in that the glowing door changes according to the opening angle of the door. Therefore, hereinafter, only the characteristic parts of this embodiment will be described.

Referring to FIGS. 18 and 19, for example, the opening of the first door 211 may be detected by the sensing part 15 (S200).

The controller 13 may control the light source 362 of the first door 211 so that the light source 362 of the first door 211 is changed from the first state to the second state when the opening of the first door 211 is detected (S201).

When the opening of the first door 211 is detected, the timer 16 may operate.

In this specification, the state change of the light source 362 of the first door 211 may be the same as the state change of the light source 362 of the first door 211 previously described in FIG. 10, so detailed description thereof will be omitted.

Hereinafter, for example, it is described that the first state is a state where the light source 362 of the first door 211 is turned off, and the second state is a state where at least one LED of a plurality of LEDs of the light source 362 of the first door 211 is turned on.

When the opening of the first door 211 is detected, at least one LED constituting the light source 362 of the first door 211 may be turned on. When at least one LED is turned on, a specific color may glow from the front surface of the open first door 211, so the user may easily recognize that the first door 211 is currently open.

When the first door 211 is open, the sensing part 15 can detect at least one of the rotation direction, opening angle, and opening and closing speed of the first door 211, and the controller 13 may change the operating state or pattern of the light source 362 of the first door 211 according to the opening angle and/or opening and closing speed of the first door 211 (S202).

Since the description of step S3 described in the previous first embodiment may be equally applied to step S202 of the present embodiment, detailed description thereof will be omitted.

In this embodiment, the first door 211 is opened by rotation, so the angle between the front surface of the first door 211 and the user's eyes may be changed. As the opening angle of the first door 211 increases, the angle between the front surface of the first door 211 and the user's eyes increases, thereby lowering the visibility of the front surface of the first door 211.

Accordingly, the controller 13 may determine whether the opening angle of the first door 211 detected by the sensing part 15 is equal to or greater than the reference angle (S203).

If it is determined that the opening angle of the first door 211 is equal to or greater than the reference angle, the controller 13 may control the light source 362 of at least one door 212 of a plurality of closed doors 212, 213, 214 in the surrounding area so that the light source 362 is changed from the first state to the second stage.

For example, FIG. 19 shows that the operation of the light source 362 of the opened first door 211 and the second door 212 arranged in the horizontal direction is controlled.

According to this embodiment, when the opening angle of the first door 211 is equal to or greater than the reference angle, the open state of the first door 211 is displayed on the second door 212, and thus there is an advantage that the open state of the first door 211 may be easily checked.

When the first door 211 is open, the sensing part 15 may detect at least one of the rotation direction, opening angle, and opening and closing speed of the first door 211, and the controller 13 may change the operating state or pattern of the light source 362 of the second door 212 according to the opening angle and/or opening and closing speed of the first door 211 (S205).

Since step S205 of this embodiment may be the same as the description of step S13 of FIG. 15 in the preceding second embodiment, detailed description thereof is omitted.

For example, when the state of the light source 362 is changed to sequential turning-on of LEDs, the number of LEDs that are turned on in the second door 212 when the opening angle of the first door 211 is equal to or greater than the reference angle will be greater than the number of LEDs that is turned on in the first door 211 when the opening angle of the first door 211 is less than the reference angle.

Meanwhile, when the first door 211 is rotated in the closing direction, if the opening angle of the first door 211 is less than the reference angle, the light source 362 of the second door 212 is changed to the third state, and the operating state or pattern of the light source 362 of the first door 211 may be changed according to the opening angle and/or opening and closing speed of the first door 211, as described in step S202.

Figure 20:
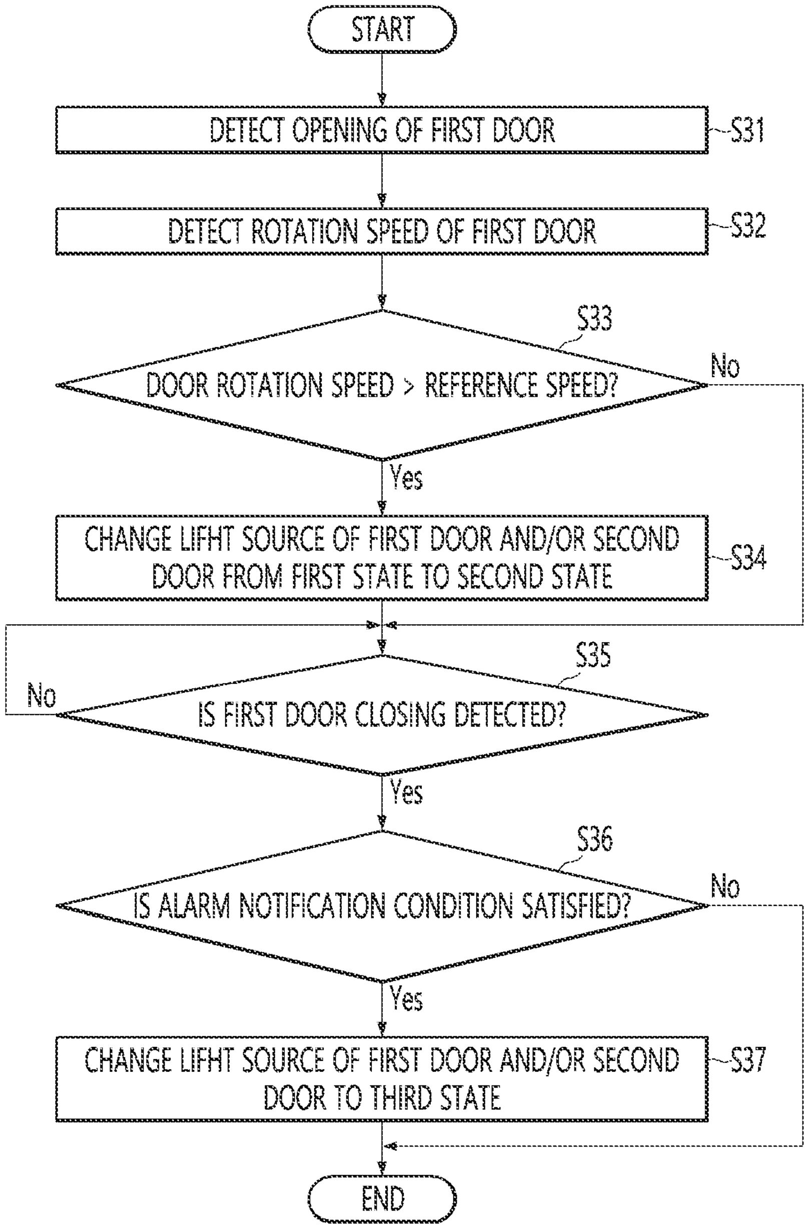
FIG. 20 is a flowchart illustrating a method for controlling a light source according to the opening and closing process of a door according to the third embodiment.
Figure 21:
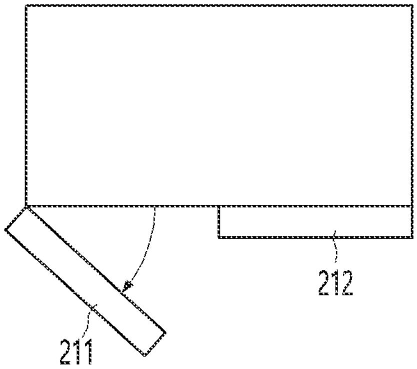
FIG. 21 is a view illustrating the operation of the light source when the door opening speed is greater than the reference speed.
Figure 21:
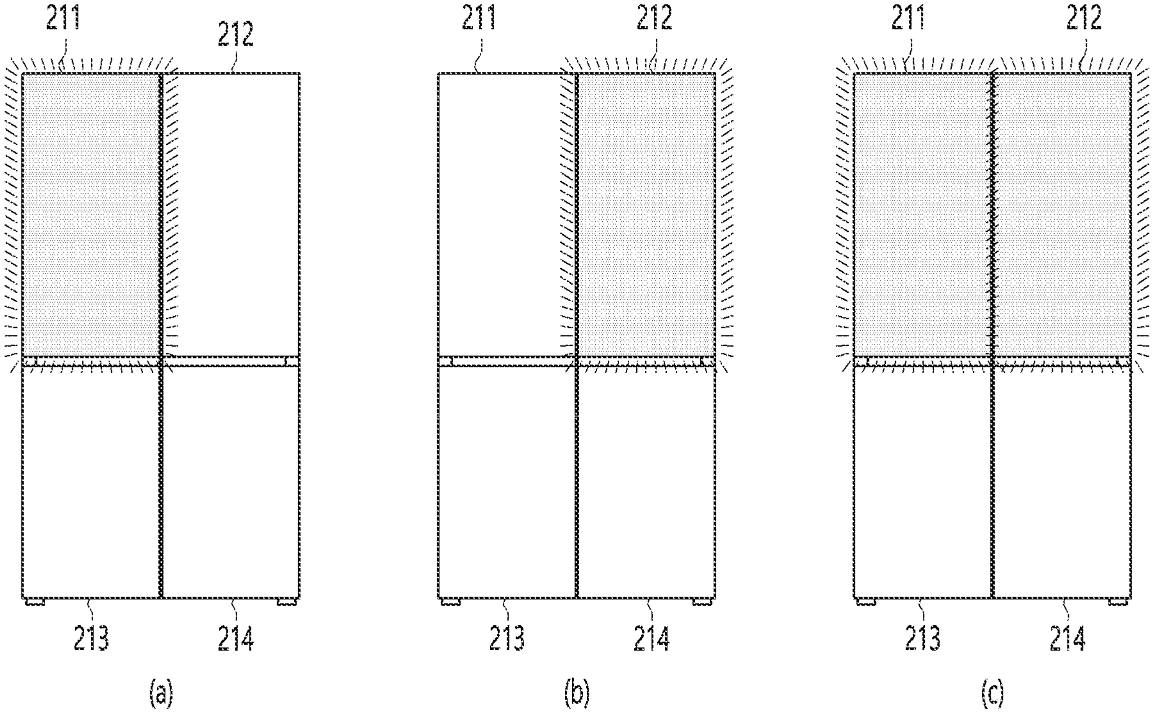
Figure 22:
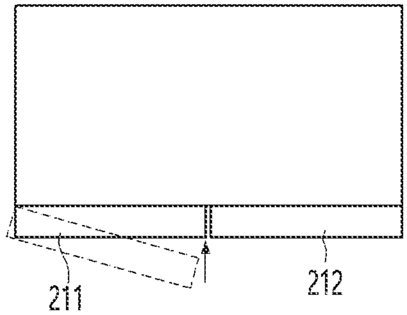
FIG. 22 is a view illustrating the operation of the light source when the closing speed of the door is greater than the reference speed according to the third embodiment.
Figure 22:
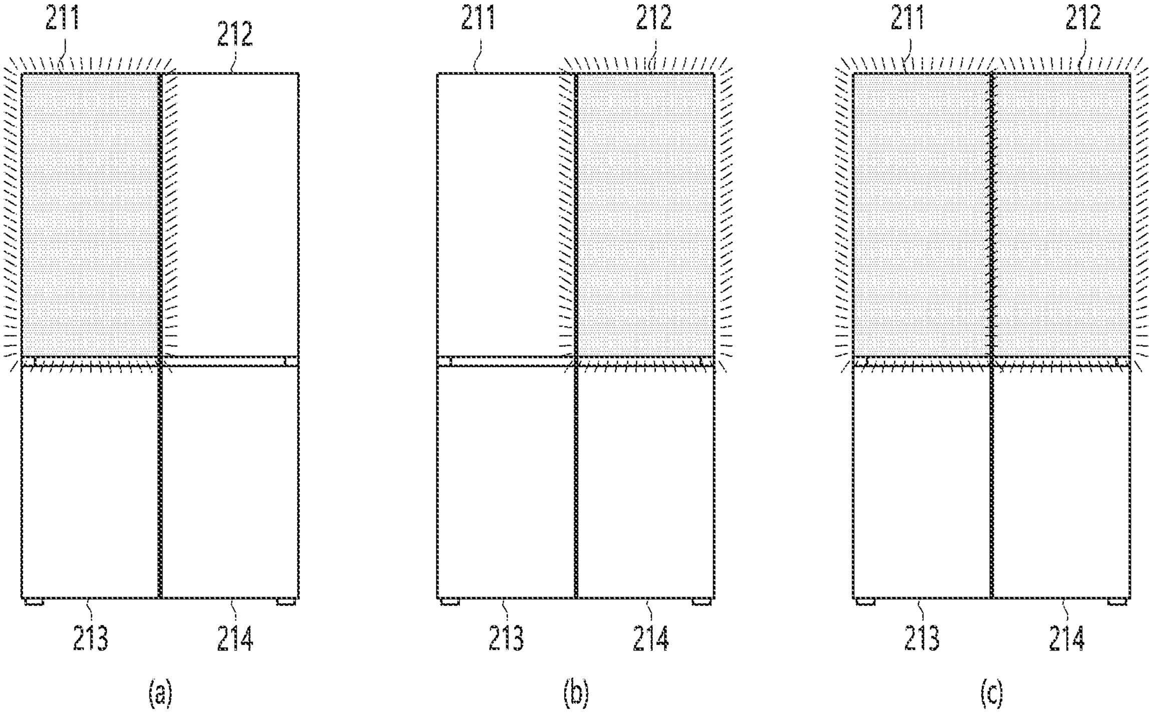
Figure 23:
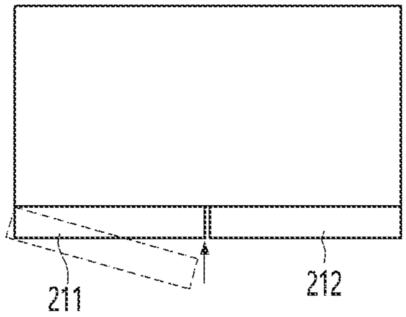
FIG. 23 is a view illustrating the operation of a light source when the door closing speed is greater than the reference speed according to the fourth embodiment.
Figure 23:
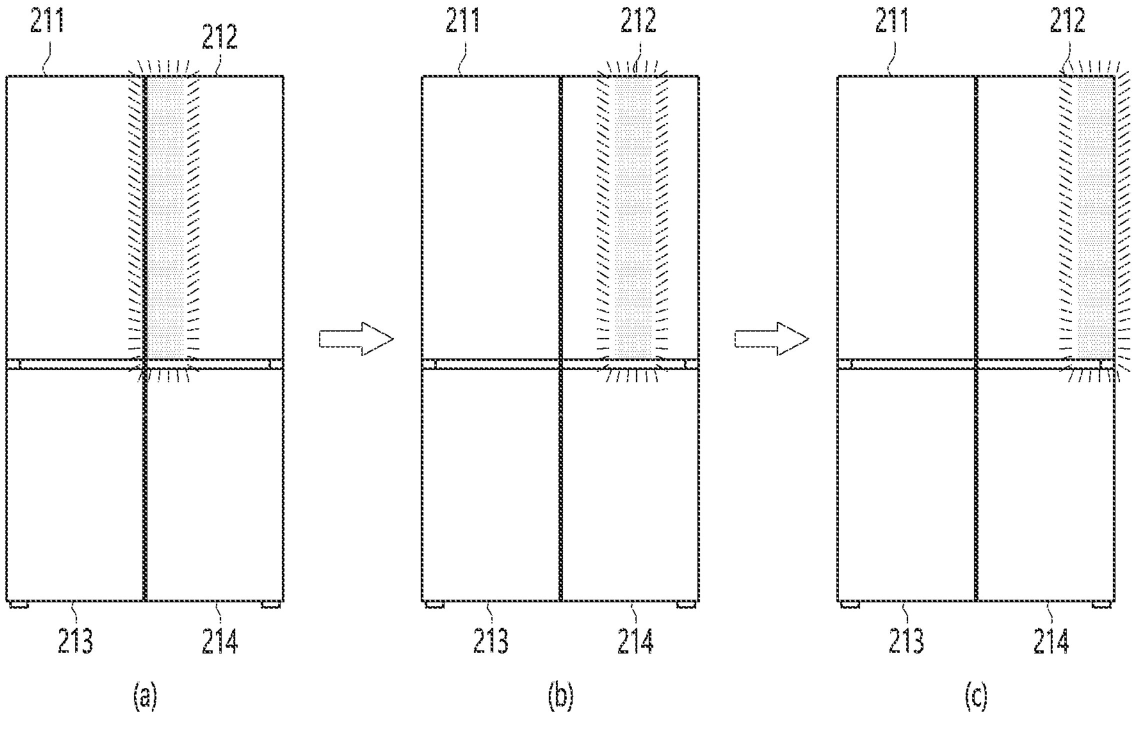

FIG. 20 is a flowchart illustrating a method for controlling a light source according to the opening and closing process of a door according to the third embodiment, FIG. 21 is a view illustrating the operation of the light source when the door opening speed is greater than the reference speed, FIG. 22 is a view illustrating the operation of the light source when the closing speed of the door is greater than the reference speed according to the third embodiment, and FIG. 23 is a view illustrating the operation of a light source when the door closing speed is greater than the reference speed according to the fourth embodiment.

Referring to FIGS. 7 and 20 to 23, the opening of the door 20 may be detected by the sensing part 15 when the door 20 is closed (S31).

In the drawing, the first door 211 is shown as open for easy understanding.

For example, after the opening of the first door 211 is detected by the sensing part 15, the rotation speed (or opening speed) of the first door 211 may be detected by the sensing part 15 (S32).

The controller 13 may determine whether the rotation speed is greater than the rotation speed of the first door 211 (S33).

As a result of the determination in step S33, if it is determined that the rotational speed of the first door 211 is greater than the reference speed, the controller 13 may control so that the light source of the first door 211 and/or the at least one of the plurality of closed doors is changed from the first state to the second state (S34). In this embodiment, step S33 may also be understood as a step of determining whether the warning notification condition is satisfied.

The state of the light source 362 of the first door 211 may be changed as shown in (a) of FIG. 21, the state of the light source 362 of the second door 212 may be changed as shown in (b) of FIG. 21, or the state of the light source 362 of each of the first door 211 and the second door 212 may be changed as shown in (c) of FIG. 21.

For example, when controlling the light source of one of the closed doors, the light source of the door that is horizontally adjacent to the open door may be controlled, the light source of the door that is vertically adjacent to the open door may be controlled, or the light source of the door that is disposed diagonally to the open door may be controlled. At this time, priority may be given in the following order: doors that are horizontally adjacent to the open door, doors that are vertically adjacent to the open door, and doors that are disposed diagonally to the open door.

When two doors are opened simultaneously or sequentially, if the opening speed of at least one door is greater than the reference speed, the light source of at least one of the remaining closed doors may be controlled.

When three doors are opened simultaneously or sequentially, if the opening speed of at least one door is greater than the reference speed, the light source of the remaining closed doors may be controlled.

Alternatively, when the opening angle of the first door 211 is equal to or greater than the reference angle, the state of the light source 362 of the second door 212 may be changed. At this time, when the opening angle of the first door 211 is less than the reference angle, the state of the light source 362 of the first door 211 may be changed.

Alternatively, when the opening angle of the first door 211 is less than the reference angle, the first door 211 and the second door 212 maintain their current state, and when the open angle of the first door 211 is equal to or greater than the reference angle, the state of the light source 362 of the second door 212 may be changed.

Hereinafter, the control of the light source 362 of the first door 211 and the light source 362 of the second door 212 horizontally adjacent to the first door 211 will be described as an example.

In this specification, the state change of the light source 362 is the same as that described in the previous embodiment, so detailed description thereof will be omitted.

When the opening speed of the first door 211 is high, there is a possibility that there is a risk that the first door 211 collides with structures around the refrigerator, the location of food stored in the first door 211 is changed, or the food falls.

In this embodiment, when the opening speed of the first door 211 is high, the first door 211 and/or the second door 212 may be made to glow to indicate that the opening speed is high.

The user may see a specific door glowing during the opening process of the first door 211 and recognize that the opening speed of the first door 211 was fast.

In this embodiment, the first door 211 is opened by rotation, so the angle between the front surface of the first door 211 and the user's eyes may be changed. As the opening angle of the first door 211 increases, the angle between the front surface of the first door 211 and the user's eyes increases, thereby lowering the visibility of the front surface of the first door 211.

Therefore, in this embodiment, in terms of user visibility, when the opening speed of the first door 211 is high, it may be desirable to control the light source of the second door 212.

Since the state change of the light source 362 in step S34 may be the same as step S37, which is performed when the warning notification condition to be described later is satisfied, it will be described in detail in step S37.

In this embodiment, step S33 may be replaced with a step of determining whether the rotation direction of the door has suddenly changed.

Step S34 can be performed immediately when the opening speed of the first door 211 is greater than the reference speed. Alternatively, step S34 may be performed when the opening speed of the first door 211 becomes greater than the reference speed and then the opening speed of the first door 211 becomes less than the limit speed (less than the reference speed). For example, step S34 may be performed when the first door 211 is opened and stops at a specific position.

Meanwhile, as a result of the determination in step S33, if the rotational speed of the first door 211 is less than the reference speed, the controller 13 may determine whether the closing of the first door 211 is detected (3S5).

When the closing of the first door 211 is detected, the controller 13 may determine whether the warning notification condition is satisfied (S36).

When the warning notification condition is satisfied may be at least one of: when the closing speed of the first door 211 is greater than the reference speed, when the sensing part 15 detects that the first door 211 is closed and then the opening of the first door 211 is detected again in a set time, when the closing of the first door 211 is detected by the sensing part 15 and then the vibration sensor provided in at least one of the plurality of doors detects vibration equal to or larger than the set magnitude, and when the closing of the first door 211 is detected by the sensing part 15 and then a knock is input from a knock detection sensor provided on at least one of the plurality of doors to detect a knock.

If it is determined in step S36 that the warning notification condition is satisfied, the controller may control so that the light source 362 of the first door 211 and/or the second door 212 is changed to the third state.

The state of the light source 362 of the first door 211 may be changed as shown in (a) of FIG. 22, the state of the light source 362 of the second door 212 may be changed as shown in (b) of FIG. 22, or the state of the light source 362 of each of the first door 211 and the second door 212 may be changed as shown in (c) of FIG. 22.

At this time, the light source 362 of the first door 211 and/or the second door 212 may be changed from the first state to the third state, or may be changed from the second state to the third state.

Hereinafter, an example in which the light source 362 is changed from the first state to the second state in step S34, and an example in which the light source 362 is changed from the first state to the second state or an example in which the light source 362 is changed from the second state to the third state in step S37 will be described.

In order for the user to intuitively check the opening speed and/or closing speed of the first door 211, the light source 362 may be turned on and then turned off at least one times. At this time, when the light source 362 is turned on and off multiple times, the on-interval of the light source 362 may be changed according to the opening speed and/or closing speed of the first door 211.

Alternatively, some LEDs of a plurality of LEDs may be turned on and off together at least one times. At this time, when some of the LEDs are turned on and off multiple times, the on-interval of some of the LEDs may be changed according to the opening speed and/or closing speed of the first door 211.

Alternatively, according to the opening speed and/or closing speed of the first door 211, the number or position of the LEDs that are turned on in the plurality of LEDs may vary.

For example, when the opening speed and/or closing speed of the first door 211 is the first speed equal to or greater than the reference speed, N LEDs of the plurality of LEDs are turned on, and when the opening speed and/or closing speed of the first door 211 is a second speed greater than the first speed, M LEDs greater than N may be turned on.

Alternatively, when the opening speed and/or closing speed of the first door 211 is greater than the reference speed, turning-on may be performed sequentially starting from the LED located on the outermost side (it may not be the outermost one), among the plurality of LEDs. At this time, according to the opening speed and/or closing speed of the first door 211, the on-interval of the LEDs may be changed.

For example, when the time interval between the first LED being turned on and the second LED being turned on is referred to as the on-interval, the faster the opening speed and/or closing speed of the first door 211, the shorter the on-interval may be. At this time, when the first door 211, which is the left door, is opened, if the opening speed and/or closing speed of the first door 211 is greater than the reference speed, for example, the LEDs may be turned on sequentially from left to right of the second door 212.

Alternatively, when the opening speed and/or closing speed of the first door 211 is greater than the reference speed, turning-on and turning-off may be performed sequentially starting from the LED located on the outermost side (it may not be the outermost one), among the plurality of LEDs.

For example, referring to (a) of FIG. 23, the first LED may be turned on. Afterwards, referring to (b) of FIG. 23, the first LED may be turned off and the second LED may be turned on. Afterwards, referring to (c) of FIG. 23, the second LED may be turned off and the third LED may be turned on.

At this time, the on-interval of the LEDs may vary according to the opening speed and/or closing speed of the first door 211.

For example, when the time interval between the first LED being turned on, the first LED being turned off, and the second LED being turned on is referred to as the on-interval, as the opening and/or closing speed of the first door 211 increases, the on-interval may decrease.

At this time, when the first door 211, which is the left door, is opened, if the opening speed and/or closing speed of the first door 211 is greater than the reference speed, for example, the LEDs may be turned on sequentially from left to right of the second door 212 and then turned off.

When each of the plurality of LEDs is sequentially turned on and then turned off, the glowing area on the door may change to provide a shaking effect, thereby emotionally expressing the fast opening speed and/or closing speed of the door.

Alternatively, when the opening speed and/or closing speed of the first door 211 is greater than the reference speed, the light source 362 emits light of the first color, but the brightness of the light emitted from the light source 362 may be changed more than once. At this time, when the brightness of the light emitted from the light source 362 is changed multiple times, the time interval during which the brightness is changed may be changed according to the opening speed and/or closing speed of the first door 211. Alternatively, as the opening speed and/or closing speed of the first door 211 increases, the brightness of the light emitted from the light source 362 may increase or decrease.

Alternatively, when the opening speed and/or closing speed of the first door 211 is greater than the reference speed, the light source 362 emits light of the first color, and the brightness of light emitted from some of the plurality of LEDs may be changed at least one times. At this time, when the brightness of the light emitted from some of the LEDs is changed multiple times, the time interval during which the brightness is changed may be changed according to the opening speed and/or closing speed of the first door 211. Alternatively, as the opening speed and/or closing speed of the first door 211 increases, the brightness of light emitted from some of the LEDs may increase or decrease.

As another example, when the opening speed and/or closing speed of the first door 211 is greater than the reference speed, the light source 362 emits light of the first color, and changing of the color of the light emitted from the light source 362 to the second color may be performed at least one times.

For example, the color of light emitted from the light source 362 may change from the first color to the second color and then change back to the first color. Alternatively, the color of light emitted from the light source 362 may change from the first color to the second color and then change back to the third color. At this time, when the color of the light emitted from the light source 362 is changed multiple times, the time interval during which the color is changed may be changed according to the opening speed and/or closing speed of the first door 211.

As another example, when the opening speed of the first door 211 is greater than the reference speed, the light source 362 emits light of a first color, and the changing of the color of the light emitted from some of the plurality of LEDs to the second color may be performed at least one times.

The color of light emitted from some of the plurality of LEDs may change from the first color to the second color and then change back to the first color. Alternatively, the color of light emitted from some LEDs may change from the first color to the second color and then change back to the third color. Alternatively, after light of the first color is emitted from a plurality of LEDs, the color of the light emitted from some of the LEDs is changed to the second color, and thereafter, the color of the light emitted from another LED of the plurality of LEDs may be changed to the third color.

At this time, when the changing of the color of light emitted from some of the LEDs is performed multiple times, the time interval during which the color is changed may be changed according to the opening speed and/or closing speed of the first door 211.

According to this embodiment, when the opening speed and/or closing speed of the door is greater than the reference speed, the color set on the door glows, allowing the user to easily recognize that the opening speed and/or closing speed of the door was fast.

Additionally, in this embodiment, by controlling the turning-on interval of a plurality of LEDs or some LEDs in the door, there is an advantage of being able to indirectly check the opening speed and/or closing speed of the door.

To explain the multiple steps in FIG. 20 from another perspective, after the first door 211 of the plurality of doors is opened, the controller 13 determines whether the warning notification condition is satisfied, and when the warning notification condition is satisfied, the light source of the door may be controlled so that the light source is changed from the first state to the second state.

In this example, when the warning notification condition is satisfied may be when the door opening speed is greater than the reference speed, or when the warning notification condition described in step S36 is satisfied.

At this time, the controller 13 may control the state of the light source to change while the first door 211 is open (performing step S34), or may control so that the state of the light source may be changed while the first door 211 is closed (performing step S37).

In the above embodiment, it has been explained that step S37 is performed when the warning notification condition is satisfied in step S36, but other cases are also possible.

For example, when the closing of the first door 211 is detected, the light source of the first door 211 and/or the second door 212 may change from the current state to the third state. For example, when the closing of the first door 211 is detected, the light source of the first door 211 and/or the second door 212 may be controlled so that light of the first color is emitted from the light source. Next, if it is determined that the warning notification condition is satisfied, the state of the light source of the first door 211 and/or the second door 212 may be changed. On the other hand, if the warning notification condition is not satisfied, the light source of the first door 211 and/or the second door 212 may be turned off after a certain period of time.

Alternatively, steps S33 and S34 may be omitted in the above embodiment.

In this case, if the opening and closing speed of the first door 211 is greater than the reference speed in at least a portion of the entire section until the first door 211 is opened and then closed, it is also possible for the light source of the first door 211 and/or the second door 212 to change from the first state to the second state after the closing of the first door 211 is detected. Alternatively, when the closing of the first door 211 is detected, the light source of the first door 211 and/or the second door 212 may be changed from the first state to the second state regardless of the opening and closing speed of the first door 211, if the opening and closing speed of the first door 211 is greater than the reference speed, in at least a portion of the entire section until the first door 211 is opened and then closed, it is also possible for the light source of the first door 211 and/or the second door 212 to change from the second state to the third state.

The second state and the third state are simply illustrative to indicate that the states are different, and if step S33 and step S34 are omitted, step S37 may be replaced by changing the light source of the first door and/or the second door from the first state to the second state.

Although the above-mentioned embodiment illustratively describes a refrigerator including a plurality of doors, it should be noted that the same can be applied even when the refrigerator includes one door.

In this case, step S34 may be replaced with a step in which the light source 362 of the door 20 is changed from the first state to the second state, and step S37 may be replaced with a step in which the light source 362 of the door 20 is changed to the third state. In either case, one of steps S34 and S37 may be omitted.

As another example, even when only some of the plurality of doors have a light source, the above-mentioned state change or various controls of the light source may be applied.

Figure 24:
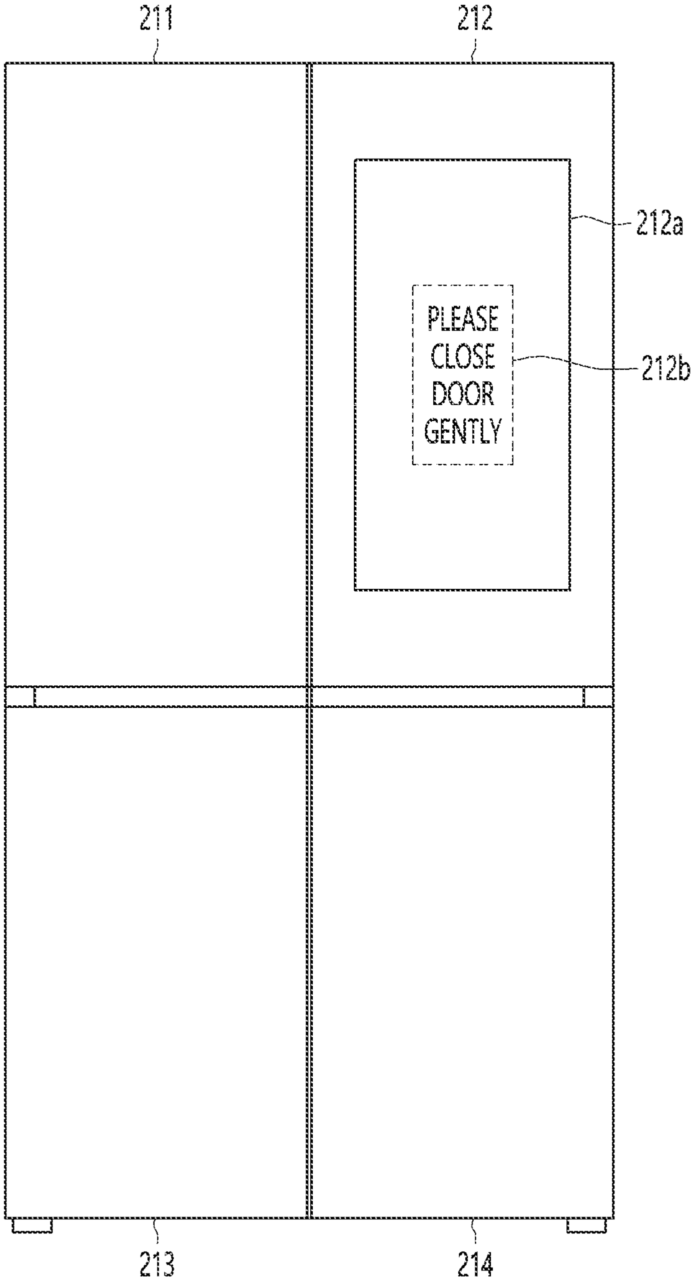
FIG. 24 is a view illustrating the operation of the refrigerator when the door closing speed is greater than the reference speed according to the fifth embodiment.

FIG. 24 is a view illustrating the operation of the refrigerator when the door closing speed is greater than the reference speed according to the fifth embodiment.

Referring to FIGS. 20 and 24, in the refrigerator of this embodiment, some doors may additionally include a display **212*a*** that displays information.

For example, FIG. 24 shows that the display **212*a* is provided in the second door 212**.

As in the previous embodiments, the first door 211 may include a light source 362, and the content described in FIG. 20 may be applied as is with respect to the first door 211.

However, step S34 may be replaced with a step in which the light source 362 of the first door 211 is changed from the first state to the second state, and step S37 may be replaced with a step in which the light source 362 of the first door 211 is changed from the third state.

Meanwhile, in a state where the closing of the first door 211 is detected, when it is determined that the warning notification condition is satisfied, warning information 212*b* may be displayed on the display 212*a* of the second door 212. The warning information 212*b* may be text information for notifying that the door closing speed was fast.

For example, the warning information 212*b* may include text such as "Please close the door gently."

At this time, if it is determined that the warning notification conditions are satisfied, warning information may also be transmitted to a remote device that can communicate with the refrigerator, and warning information may also be output from the remote device.

Alternatively, the number of times the warning notification condition is satisfied may be accumulated and counted. The accumulated number of times may be stored in the memory 18.

In a state where the closing of the first door 211 is detected, when the accumulated number of times the warning notification condition is satisfied reaches the standard number, warning information 212*b* may also be displayed on the display 212*a* of the second door 212.

Information about the accumulated number of times stored in the memory 18 may be displayed on the display 212*a*.

On the display 212*a*, the warning information 212*b* and, alternatively or additionally, information on the number of times the warning notification condition is satisfied within a specific period may be displayed. For example, text information such as "The number of times the door has been closed hard in the past week is 3 times" may be displayed.

If the refrigerator 1 additionally includes an output part (for example, a speaker) that outputs sound information, when warning information 212*b* is displayed on the display 212*a*, the warning information may also be output from the output part. For example, voice information such as "Please close the door gently" may be output from the output part.

According to this embodiment, if the closing speed of the door is greater than the standard speed for the user, warning information may be displayed on the door display, so there is an advantage that the user can easily recognize that the closing speed of the door is greater than the standard speed.

The embodiments described above are not implemented independently, and it is possible for two embodiments to be implemented together. That is, it is possible to implement the fourth or fifth embodiment in combination with any one of the previous first to third embodiments, and it is also possible to derive an embodiment that combines three or more embodiments.

The invention claimed is:

1. An appliance comprising:

a cabinet that defines a storage therein;

a door configured to open and close at least a portion of the storage, the door comprising (i) a lighting device including a light source and (ii) a front plate configured to transmit light emitted from the light source;

at least one sensor configured to detect whether the door is opened; and a controller configured to control the lighting device based on information detected by the at least one sensor, wherein the controller is configured to control the light source to change from a first state to a second state based on the door being opened, wherein the light source comprises a plurality of light-emitting diodes (LEDs), and wherein the controller is configured to:

based on the door being opened by a first angle, turn on a first LED among the plurality of LEDs, and based on the door being opened by a second angle greater than the first angle, turn on a second LED, in addition to the first LED, among the plurality of LEDs.

2. The appliance of claim 1, wherein the at least one sensor comprises an acceleration sensor or a gyro sensor configured to detect at least one of (i) an opening angle of the door relative to the cabinet or (ii) an opening and closing speed of the door.

3. The appliance of claim 2, wherein the controller is configured to turn on all of the plurality of LEDs based on the opening angle of the door corresponding to a preset maximum opening angle.

4. The appliance of claim 1, wherein the controller is configured to change a state of the light source based on at least one of (i) an opening angle of the door or (ii) an opening and closing speed of the door.

5. The appliance of claim 4, wherein the controller is configured to:

define a glowing area in at least a portion of the front plate based on the front plate transmitting the light from the light source; and control the light source to increase the glowing area in the front plate based on an increase of the opening angle of the door.

6. The appliance of claim 1, wherein the controller is configured to, based on an elapse of a reference time after the door is opened, control the light source to change a state of the light source to thereby indicate a non-closed state of the door.

7. The appliance of claim 6, wherein the controller is configured to:

control the light source to emit light in a first color before the reference time elapses after the door is opened; and control the light source to emit light in a second color based on the elapse of the reference time after the door is opened.

8. The appliance of claim 1, wherein the controller is configured to control the light source to change from a current state to a third state based on the at least one sensor detecting that the door is closed.

9. The appliance of claim 1, wherein the door is one of:

a first door configured to open and close at least a portion of the storage, the first door including a first light source; or a second door configured to open and close at least another portion of the storage, the second door including a second light source, wherein the light source is one of the first light source or the second light source, and wherein the controller is configured to control the first light source of the first door to change from the first state to the second state based on the first door being opened.

10. The appliance of claim 9, wherein the controller is configured to control the second light source of the second door to change from the first state to the second state based on an opening angle of the first door being equal to or greater than a reference angle.

11. The appliance of claim 10, wherein the first door comprises a first front plate configured to transmit light emitted from the first light source, and the second door comprises a second front plate configured to transmit light emitted from the second light source, and wherein the controller is configured to:

define a glowing area in at least a portion of the first front plate based on the first front plate transmitting the light from the first light source, and control the first light source of the first door to increase the glowing area in the first front plate of the first door based on an increase of the opening angle of the first door.

12. The appliance of claim 10, wherein the first door comprises a first front plate configured to transmit light emitted from the first light source, and the second door comprises a second front plate configured to transmit light emitted from the second light source, and wherein the controller is configured to:

define a glowing area in at least a portion of the first front plate based on the first front plate transmitting the light from the first light source;

based on an increase of the opening angle of the first door, control the first light source of the first door to increase the glowing area of the first door in a direction away the second door; and based on the first door being closed, control the first light source of the first door to decrease the glowing area in a direction toward the second door.

13. The appliance of claim 9, wherein the first door comprises a first front plate configured to transmit light emitted from the first light source, and the second door comprises a second front plate configured to transmit light emitted from the second light source, and wherein the controller is configured to:

define a glowing area in at least a portion of the first front plate based on the first front plate transmitting the light from the first light source, and control the first light source to vary a speed of change of the glowing area in the first front plate of the first door based on an opening and closing speed of the first door.

14. The appliance of claim 1, wherein the controller is configured to control the light source of the door to change from the first state to the second state based on a rotational speed of the door becoming greater than a reference speed after the at least one sensor detects that the door is opened.

15. The appliance of claim 1, wherein the controller is configured to:

based on the at least one sensor detecting that the door is opened and then closed, determine whether a warning notification condition is satisfied; and based on determining that the warning notification condition is satisfied, control the light source of the door to change from a current state to a third state.

16. The appliance of claim 15, wherein the controller is configured to determine that the warning notification condition is satisfied based on at least one of:

a closing speed of the door being greater than a reference speed;

detecting that the door is opened within a set time after the door is closed;

detecting, by a vibration sensor of the door, a vibration being greater than or equal to a set magnitude after the door is closed; or detecting, by a knock detection sensor of the door, a knock input after the door is closed.

17. The appliance of claim 1, wherein the door is one of:

a first door configured to open and close at least a portion of the storage, the first door including a first light source; or a second door configured to open and close at least another portion of the storage, the second door including a second light source, wherein the light source is one of the first light source or the second light source, and wherein the controller is configured to:

determine whether a warning notification condition is satisfied after the first door is opened, and based on determining that the warning notification condition is satisfied, change a state of at least one of the first light source or the second light source.

18. The appliance of claim 17, wherein the controller is configured to, based on determining that the warning notification condition is satisfied after the first door is closed, change the state of at least one of the first light source or the second light source.

19. The appliance of claim 18, wherein the controller is configured to determine that the warning notification condition is satisfied based on at least one of:

a closing speed of the first door being greater than a reference speed;

detecting the first door is opened within a set time after the first door is closed;

detecting, by a vibration sensor of at least one of the first and second doors, a vibration being greater than or equal to a set magnitude after the first door is closed; or detecting, by a knock detection sensor of at least one of the first and second doors, a knock input after the first door is closed.

20. The appliance of claim 18, wherein at least one of the first and second doors comprises a display, and wherein the controller is configured to control the display to output warning information based on determining that the warning notification condition is satisfied after the first door is closed.

21. The appliance of claim 20, further comprising a memory configured to store information about a number of times that the warning notification condition is satisfied, and wherein the display is configured to display the information about the number of times stored in the memory.

22. The appliance of claim 18, further comprising an output part configured to output sound information, wherein the controller is configured to control the output part to output warning information based on determining that the warning notification condition is satisfied after the first door is closed.

23. The appliance of claim 17, wherein the controller is configured to:

based on the first door being closed, control at least one of the first light source or the second light source to emit light in a first color; and based on determining that the warning notification condition is satisfied, change the state of at least one of the first light source or the second light source.

24. The appliance of claim 23, wherein the controller is configured to, based on determining that the warning notification condition is not satisfied within a predetermined time after the first door is closed, turn off at least one of the first light source or the second light source.

25. The appliance of claim 17, wherein the controller is configured to, based on determining that the warning notification condition is satisfied before detecting that the first door is closed, change the state of at least one of the first light source or the second light source.

26. The appliance of claim 25, wherein the controller is configured to determine that the warning notification condition is satisfied based on an opening speed of the first door or the second door being greater than a reference speed.

27. An appliance comprising:

a cabinet that defines a storage therein;

a first door configured to open and close at least a portion of the storage, the first door including a first light source;

a second door configured to open and close at least another portion of the storage, the second door including a second light source;

at least one sensor configured to detect whether at least one of the first door or the second door is opened; and a controller configured to control at least one of the first light source or the second light source based on information detected by the at least one sensor, wherein the controller is configured to control the second light source of the second door to change from a first state to a second state based on the first door being opened.

28. The appliance of claim 27, wherein the controller is configured to change a state of the second light source of the second door based on at least one of (i) an opening angle of the first door or (ii) an opening and closing speed of the first door.

29. The appliance of claim 28, wherein the first door comprises a first front plate configured to transmit light emitted from the first light source, and the second door comprises a second front plate configured to transmit light emitted from the second light source, and wherein the controller is configured to:

define a glowing area in at least a portion of the second front plate based on the second front plate transmitting the light from the second light source, and control the second light source of the second door to increase the glowing area in the second front plate of the second door based on an increase of the opening angle of the first door.

30. The appliance of claim 29, wherein the second light source of the second door comprises a plurality of light-emitting diodes (LEDs), and wherein the controller is configured to control the second light source of the second door to increase a number of the plurality of LEDs to be turned on based on the increase of the opening angle of the first door.

31. The appliance of claim 29, wherein the controller is configured to control the second light source to vary a speed of change of the glowing area in the second front plate of the second door based on the opening and closing speed of the first door.

32. The appliance of claim 31, wherein the second light source of the second door comprises a plurality of light-emitting diodes (LEDs), and wherein the controller is configured to vary a turning-on interval of the plurality of LEDs of the second door to thereby sequentially turn on the plurality of LEDs of the second door based on the opening and closing speed of the first door.

33. The appliance of claim 27, wherein the first door comprises a first front plate configured to transmit light emitted from the first light source, and the second door comprises a second front plate configured to transmit light emitted from the second light source, and wherein the controller is configured to:

define a glowing area in at least a portion of the second front plate based on the second front plate transmitting the light from the second light source, while the first door is opened, control the second light source of the second door to increase the glowing area in the second door in a direction away from the first door; and while the first door is closed, control the second light source of the second door to decrease the glowing area in the second door in a direction toward the first door.

34. The appliance of claim 27, wherein the controller is configured to, based on the first door being closed, control the second light source of the second door to change from a current state to a third state.

35. The appliance of claim 27, wherein the controller is configured to change an operating state of the second light source of the second door to thereby indicate a non-closed state of the first door before a reference time elapses after the first door is opened.

36. The appliance of claim 35, wherein the controller is configured to:

control the second light source of the second door to emit light in a first color before the reference time elapses after the first door is opened; and control the second light source of the second door to emit light in a second color based on an elapse of the reference time after the first door is opened.

37. An appliance comprising:

a cabinet that defines a storage therein;

a door configured to open and close at least a portion of the storage, the door comprising (i) a lighting device including a light source and (ii) a front plate configured to transmit light emitted from the light source;

at least one sensor configured to detect whether the door is opened; and a controller configured to control the lighting device based on information detected by the at least one sensor, wherein the controller is configured to control the light source to change from a first state to a second state based on the door being opened, wherein the light source comprises a plurality of light-emitting diodes (LEDs), and wherein the controller is configured to change a state of the plurality of LEDs based on an opening and closing speed of the door after the door is opened.

38. The appliance of claim 37, wherein the controller is configured to:

define a glowing area in at least a portion of the front plate based on the front plate transmitting the light from the light source; and control the light source to vary a rate of change of the glowing area in the front plate based on the opening and closing speed of the door.

39. The appliance of claim 38, wherein the controller is configured to change a turning-on interval of the plurality of LEDs to thereby sequentially turn on or off the plurality of LEDs based on the opening and closing speed of the door.

* * * * *